United States Patent
Toya

(10) Patent No.: US 10,167,048 B2
(45) Date of Patent: Jan. 1, 2019

(54) POWER STORAGE DEVICE AND CONTROL METHOD THEREOF

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/076,652

(22) Filed: Mar. 22, 2016

(65) Prior Publication Data

US 2016/0200394 A1    Jul. 14, 2016

Related U.S. Application Data

(63) Continuation of application No. PCT/JP2015/000511, filed on Feb. 5, 2015.

(30) Foreign Application Priority Data

Feb. 18, 2014 (JP) .................................. 2014-028763
Feb. 18, 2014 (JP) .................................. 2014-028764
Feb. 18, 2014 (JP) .................................. 2014-028765

(51) Int. Cl.
*B62M 6/45* (2010.01)
*B60L 15/08* (2006.01)
(Continued)

(52) U.S. Cl.
CPC .............. *B62M 6/45* (2013.01); *B60L 11/007* (2013.01); *B60L 11/1861* (2013.01);
(Continued)

(58) Field of Classification Search
None
See application file for complete search history.

(56) References Cited

U.S. PATENT DOCUMENTS 5,170,161 A * 12/1992 Sakurai .................. G01P 3/487
340/12.13
5,627,438 A * 5/1997 Barrett ..................... B60K 1/02
123/349

(Continued)

FOREIGN PATENT DOCUMENTS

CN          1135993 A      11/1996
CN       101385057 A       3/2009
(Continued)

OTHER PUBLICATIONS

International Search Report of PCT application No. PCT/JP2015/000511 dated Apr. 21, 2015.
(Continued)

*Primary Examiner* — Katy M Ebner
(74) *Attorney, Agent, or Firm* — Greenblum & Bernstein, P.L.C.

(57) ABSTRACT

A power storage device includes a storage battery, a mounting unit that detachably mounts the power storage device on a motor-driven moving object, an output controller that controls output of driving power from the storage battery to the motor-driven moving object, and a controller that, when the motor-driven moving object is within a particular area, causes the output controller to reduce the driving power supplied from the power storage device to the motor-driven moving object compared to the driving power when the motor-driven moving object is outside the particular area.

18 Claims, 18 Drawing Sheets

(51) Int. Cl.
*B62M 6/90* (2010.01)
*G05D 1/00* (2006.01)
*B60L 11/00* (2006.01)
*B60L 11/18* (2006.01)
*H02J 13/00* (2006.01)
*H02J 7/00* (2006.01)

(52) U.S. Cl.
CPC ............... *B60L 15/08* (2013.01); *B62M 6/90* (2013.01); *G05D 1/0022* (2013.01); *H02J 13/0003* (2013.01); *B60L 2200/12* (2013.01); *B60L 2240/622* (2013.01); *B60L 2240/68* (2013.01); *B60L 2240/70* (2013.01); *B60L 2250/16* (2013.01); *B60L 2250/26* (2013.01); *B60L 2260/54* (2013.01); *H02J 2007/0098* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/162* (2013.01)

(56) References Cited

U.S. PATENT DOCUMENTS

| | | | | |
|---|---|---|---|---|
| 5,857,537 | A * | 1/1999 | Matsumoto | B62M 6/45 180/206.2 |
| 9,648,107 | B1 * | 5/2017 | Penilla | H04L 67/12 |
| 2003/0102714 | A1 * | 6/2003 | Rhodes | B60L 3/08 303/193 |
| 2005/0077096 | A1 * | 4/2005 | Kokatsu | B62M 6/45 180/207.1 |
| 2005/0285461 | A1 * | 12/2005 | Kitamura | B62M 25/08 310/67 A |
| 2007/0198160 | A1 | 8/2007 | Sheynblat | |
| 2007/0257783 | A1 * | 11/2007 | Matsumoto | B60K 6/445 340/425.5 |
| 2008/0177433 | A1 * | 7/2008 | Teo | B60L 11/1801 701/22 |
| 2009/0181826 | A1 * | 7/2009 | Turner | B62M 6/50 482/4 |
| 2010/0198453 | A1 * | 8/2010 | Dorogusker | A63B 24/0062 701/31.4 |
| 2011/0025267 | A1 * | 2/2011 | Kamen | B60L 8/003 320/109 |
| 2011/0093149 | A1 * | 4/2011 | Tanaka | B60Q 5/008 701/22 |
| 2011/0133542 | A1 * | 6/2011 | Ratti | B60B 1/003 301/6.5 |
| 2011/0202219 | A1 * | 8/2011 | Ishibashi | B60L 11/1809 701/22 |
| 2013/0179016 | A1 * | 7/2013 | Gale | B60L 3/0061 701/22 |
| 2013/0249522 | A1 * | 9/2013 | Satake | H02J 7/1438 323/304 |
| 2014/0080661 | A1 * | 3/2014 | Paick | B60W 10/08 477/3 |
| 2014/0163797 | A1 * | 6/2014 | Schieffelin | B62M 6/45 701/22 |
| 2014/0209400 | A1 * | 7/2014 | Yao | B62M 6/45 180/167 |
| 2014/0229046 | A1 * | 8/2014 | Gros | B62J 99/00 701/22 |
| 2015/0291036 | A1 * | 10/2015 | Ryu | B60L 1/00 701/22 |
| 2015/0314691 | A1 * | 11/2015 | Dorny | B60L 11/1805 307/10.1 |

FOREIGN PATENT DOCUMENTS

| | | |
|---|---|---|
| JP | 2001-191976 | 7/2001 |
| JP | 2006-273142 A | 10/2006 |
| JP | 2006-340559 | 12/2006 |
| JP | 2008-042985 A | 2/2008 |
| JP | 2009-009281 | 1/2009 |
| JP | 2013-034147 A | 2/2013 |
| JP | 2013-512825 | 4/2013 |
| JP | 2013-106377 | 5/2013 |
| JP | 2013-171502 | 9/2013 |
| JP | 2013-171502 A | 9/2013 |
| WO | 2011/069136 | 6/2011 |

OTHER PUBLICATIONS

English Translation of Chinese Search Report dated May 17, 2018 for the related Chinese Patent Application No. 201580001645.X.
English Translation of Chinese Search Report dated Oct. 15, 2018 for the related Chinese Patent Application No. 201580001645.X.

* cited by examiner

FIG. 13

| GRADIENT | GRADIENT USED POWER AMOUNT |
|---|---|
| 1 | 5 |
| 2 | 10 |
| 3 | 15 |
| ⋮ | ⋮ |

FIG. 19

| FIRST POINT LONGITUDE, (LATITUDE, ALTITUDE) | SECOND POINT LONGITUDE, (LATITUDE, ALTITUDE) | INTER-POINT AVERAGE USED POWER AMOUNT | AVERAGE TRAVELING TIME | FREQUENCY |
|---|---|---|---|---|
| (X1, Y1, Z1) | (X2, Y2, Z2) | 3 | 3 | 7 |
| (X2, Y2, Z2) | (X3, Y3, Z3) | 5 | 3 | 7 |
| (X3, Y3, Z3) | (X4, Y4, Z4) | 7 | 3 | 7 |
| ... | ... | ... | ... | ... |

POWER STORAGE DEVICE AND CONTROL METHOD THEREOF

BACKGROUND

1. Technical Field

The present disclosure relates to a power storage device including a storage battery and a control method thereof.

2. Description of the Related Art

Storage batteries have been used as the power sources of the motor-driven moving objects, such as power-assisted bicycles.

For example, a power-assisted bicycle uses a storage battery as a power source for driving a motor, detects the pedaling force using a sensor, and controls the power outputted from the storage battery to the motor on the basis of the detection result.

Power-assisted bicycles have been proposed that when the current location thereof falls within an area requiring caution or when the distance between the power-assisted bicycle and another vehicle falls within a predetermined distance, cause an assisting drive controller to change the assisting drive force for assisting the pedaling force and to give an alarm (e.g., Japanese Unexamined Patent Application Publication No. 2013-171502).

SUMMARY

The above conventional power-assisted bicycles are previously provided with the above control function and therefore can perform the control function. However, power-assisted bicycles which are not previously provided with the control function have difficulty in performing the control function. This problem is common to power-assisted bicycles, as well as to motor-driven moving objects using storage batteries as driving power sources.

One non-limiting and exemplary embodiment provides a power storage device and control thereof that improve the problem.

In one general aspect, the techniques disclosed here feature a power storage device including a storage battery, a mounting unit that detachably mounts the power storage device on a motor-driven moving object, an output controller that controls output of driving power from the storage battery to the motor-driven moving object, and a controller that, when the motor-driven moving object is within a particular area, causes the output controller to reduce the driving power supplied from the power storage device to the motor-driven moving object compared to the driving power when the motor-driven moving object is outside the particular area.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

According to the power storage device, it is possible to reduce the driving power of a motor-driven moving object in a particular area by causing a power storage device to perform the control of the present disclosure, even when the motor-driven moving object itself is not previously provided with the function of controlling the driving power in a particular area.

BRIEF DESCRIPTION OF THE DRAWINGS

FIG. 13 is a diagram showing an example of gradient-power amount relationship information according to a third embodiment;

FIG. 19 is a diagram showing an example of storage battery power use history information used in a modification of the third embodiment.

DETAILED DESCRIPTION

First Embodiment

Now, a first embodiment of the present disclosure will be described with reference to the drawings.

Figure 1:
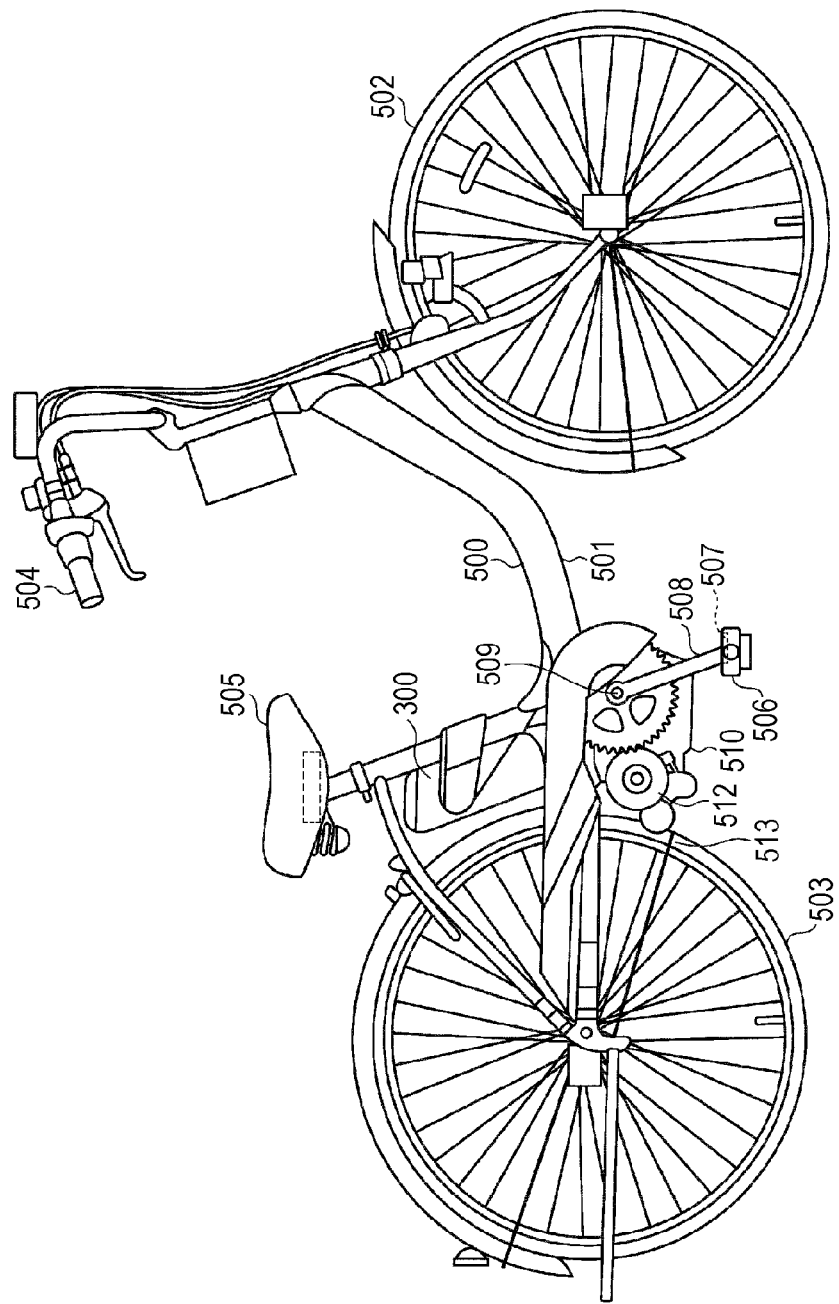
FIG. 1 is a schematic view of a power-assisted bicycle equipped with a power storage device of a first embodiment of the present disclosure.

FIG. 1 is a schematic view of a power-assisted bicycle equipped with a power storage device of a first embodiment.

A body frame 501 of a power-assisted bicycle 500 has thereon a front wheel 502, a rear wheel 503, a handlebar 504, a saddle 505, a pedal 506, a pedaling force detector 507, a crank arm 508, a crankshaft 509, an assisting power unit 510, and a control unit 511.

The pedal 506 is connected to the crankshaft 509 through the crank arm 508. The crankshaft 509 is connected to the assisting power unit 510. When the user steps on the pedal 506, the pedaling force is converted into the rotational force of crankshaft 509 through the crank arm 508. The rotational force is transmitted to the assisting power unit 510.

A power storage device 300 including a storage battery is detachably mounted on a position below the saddle 505, of the body frame 501.

The pedaling force detector 507 includes, for example, a pressure sensor and is mounted on the pedal 506. When the user steps on the pedal 506 to pedal the power-assisted bicycle 500, pedaling force occurs. The pedaling force detector 507 detects this pedaling force.

The assisting power unit 510 includes, for example, a motor 512, gears, and clutch mechanism. The control unit 511 outputs a control signal related to the drive of the motor 512 to the assisting power unit 510 on the basis of the pedaling force detected by the pedaling force detector 507, or the like. In response to the control signal from the control unit 511, the assisting power unit 510 receives the supply of the driving power from the storage battery of the power storage device 300 and drives the motor 512. The assisting power unit 510 then adds, through the gears and clutch mechanism, the obtained driving power to the rotational force of the crankshaft 509 resulting from the stepping on the pedal 506 by the user, thereby generating the driving force of the rear wheel 503. The assisting power unit 510 then transmits the driving force thus generated to the rear wheel 503, for example, through a chain 513.

Note that the structure of the power-assisted bicycle 500 shown in FIG. 1 is only illustrative.

Figure 2:
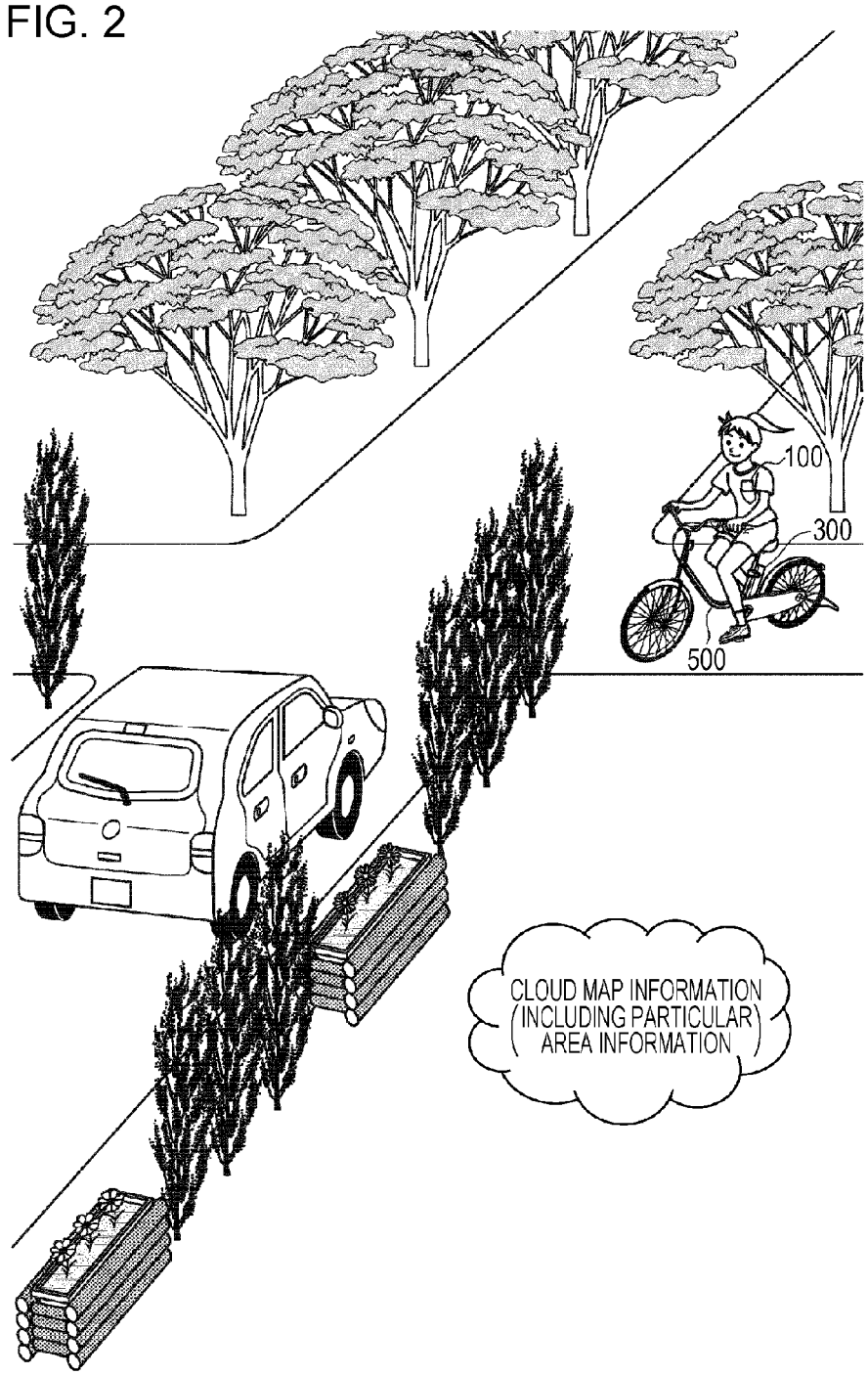
FIG. 2 is a schematic view showing the state in which the user is riding and driving the power-assisted bicycle equipped with the power storage device in FIG. 1.

FIG. 2 is a schematic view showing the state in which the user is riding and driving the power-assisted bicycle equipped with the power storage device in FIG. 1.

The user is carrying a mobile terminal 100 and is riding and driving the power-assisted bicycle 500 on which the power storage device 300 is detachably mounted. The mobile terminal 100 is connected to, for example, a server in a cloud (computer network) via a network, as well as connected to the power storage device 300 wirelessly.

The mobile terminal 100 acquires map information from the server in the cloud. It is assumed that this map information includes, for example, information about areas in which the power-assisted bicycle 500 may collide with a moving object, such as an automobile or bicycle, or a pedestrian, that is, an accident is more likely to occur. Hereafter, such an area and such information will be referred to as "a particular area" and "particular area information," respectively. Examples of a particular area include an intersection and its vicinity in which there is a blind spot, a hill on which bicycles are more likely to travel fast, and an area in which moving objects, such as automobiles or bicycles, or pedestrians are close to each other.

The mobile terminal 100 repeatedly acquires location information indicating the location of the mobile terminal 100, for example, using the Global Positioning System (GPS). The mobile terminal 100 determines whether the user is driving the power-assisted bicycle 500 within a particular area, on the basis of the particular area information and location information. If it determines that the user is driving the power-assisted bicycle 500 within a particular area, the mobile terminal 100 wirelessly transmits an output power control command signal to the power storage device 300. On the basis of the output power control command signal, the power storage device 300 controls the output of the driving power from the storage battery to the motor of the power-assisted bicycle 500.

In the first embodiment, the output power control command is a command to intermittently output the driving power from the storage battery of the power storage device 300 to the motor of the power-assisted bicycle 500 so that the user can recognize that the power-assisted bicycle 500 is operating discontinuously. If the output power control command is such a command, the power-assisted bicycle 500 operates discontinuously and thus the user can recognize that he or she is driving the power-assisted bicycle 500 within a particular area.

The intermittent output of the driving power is performed, for example, by outputting the driving power having a pulse waveform in which an ON period and an OFF period are repeated. The lengths of ON and OFF periods are, for example, lengths such that the user can feel that the power-assisted bicycle is operating discontinuously. Note that an OFF period may be a period in which the output is reduced compared to in an ON period.

The intermittent output of the driving power need not be performed using pulse power as described above and may be performed in any manner as long as the user can recognize that the power-assisted bicycle 500 is operating discontinuously. The intermittent output of the driving power is one of methods for, when the motor-driven moving object of the present disclosure is within a particular area, reducing the driving power compared to that when it is outside the particular area. For example, the intermittent output of the driving power is performed using a switching element that turns on or off the supply of the driving power from the power storage device to the motor-driven moving object, but may be performed using other means. Examples of such a switching element include an FET.

Further, the driving power need not be intermittently outputted from the storage battery of the power storage device 300 to the motor of the power-assisted bicycle 500 as long as the user can recognize that the power-assisted bicycle 500 is operating discontinuously.

The configurations of the mobile terminal 100, power storage device 300, and power-assisted bicycle 500 will be described in turn with reference to the drawings.

Figure 3:
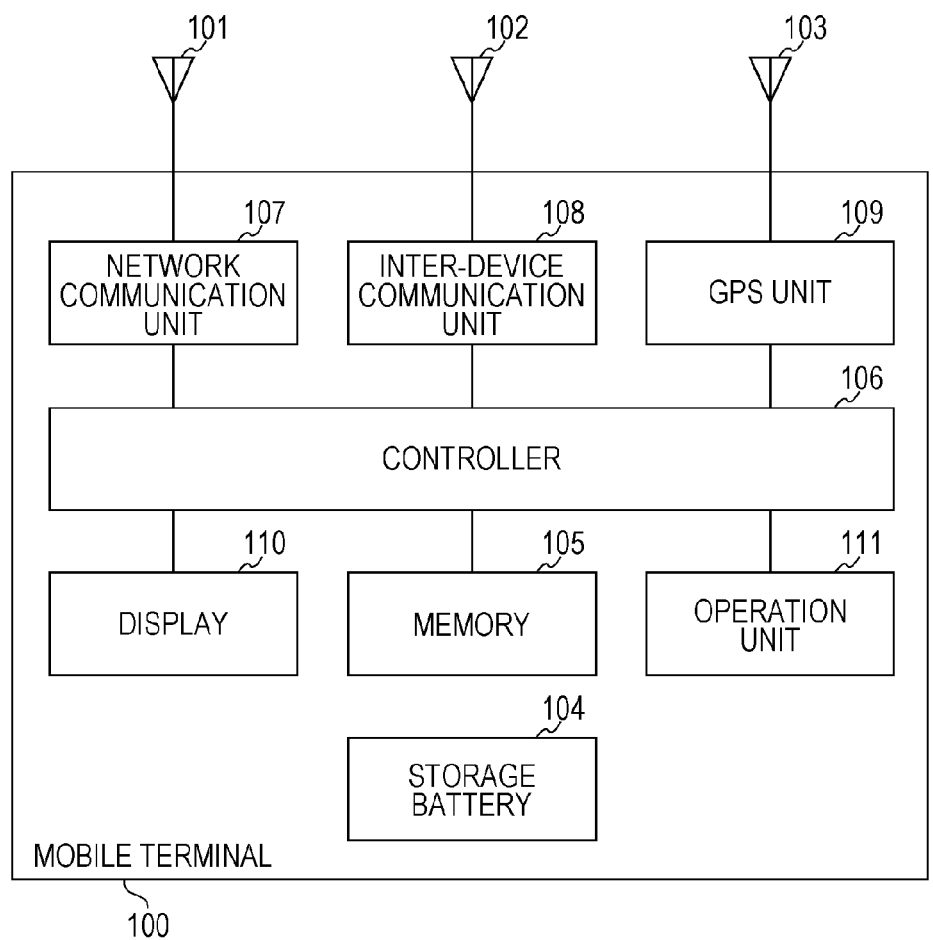
FIG. 3 is a block diagram showing the configuration of a mobile terminal according to the first embodiment.

FIG. 3 is a block diagram showing the configuration of the mobile terminal 100 according to the first embodiment.

The mobile terminal 100 is, for example, a smartphone or tablet terminal. It is assumed that the mobile terminal 100 and power storage device 300 are paired in advance. Thus, when the mobile terminal 100 and power storage device 300 approach each other, both are automatically wirelessly connected; when both move away from each other, the wireless connection is automatically shut down.

The mobile terminal 100 includes antennas 101, 102, 103, a storage battery 104, a memory 105, a controller 106, a network communication unit 107, an inter-device communication unit 108, a GPS unit 109, a display 110, and an operation unit 111.

The storage battery 104 is the power source of elements that require power in the mobile terminal 100. Note that in FIG. 3, power lines for connecting the storage battery 104 and the elements requiring power are omitted for simplicity.

The memory 105 is a memory for storing control programs, application programs, or the like.

The controller 106 performs various types of control and computing on the entire mobile terminal 100. The controller 106 also temporarily stores information acquired from outside or the like, an intermediate or final result of computing, or the like in the memory 105. Further, the controller 106 of the first embodiment performs a storage battery output control process (to be discussed later with reference to FIG. 5) in conjunction with other elements of the mobile terminal 100.

The storage battery output control process performed by the controller 106 of the first embodiment will be briefly described below.

The controller 106 determines whether the mobile terminal 100 is within a particular area, that is, the user is driving the power-assisted bicycle 500 within a particular area, on the basis of the particular area information included in the map information received from the server in the cloud and the location information repeatedly acquired by the GPS unit 109. If it determines that the user is driving the power-assisted bicycle 500 within a particular area, the controller 106 transmits an output power control command to the power storage device 300.

After transmitting the output power control command to the power storage device 300, the controller 106 determines whether the mobile terminal 100 is outside the particular area, that is, the user driving the power-assisted bicycle 500 has gone out of the particular area, on the basis of the particular area information and the repeatedly acquired location information. If it determines that the user driving the power-assisted bicycle 500 has gone out of the particular area, the controller 106 transmits an output power control stop command to the power storage device 300.

The network communication unit 107 is connected to, for example, a public line network through an antenna 101. The network communication unit 107 performs encoding, modulation, or the like on data from the controller 106 and transmits the resulting data to the server in the cloud or the like. The network communication unit 107 also performs demodulation or decoding on data received from the server in the cloud or the like and outputs the resulting data to the controller 106.

The inter-device communication unit 108 wirelessly communicates with a device, such as the power storage device 300, through an antenna 102. Examples of the wireless communication include Bluetooth® and WiFi®. The inter-device communication unit 108 performs encoding, modulation, or the like on data from the controller 106 and transmits the resulting data to a device, such as power storage device 300. The inter-device communication unit 108 also performs demodulation or decoding on data received from a device, such as the power storage device 300, and outputs the resulting data to the controller 106.

The GPS unit 109 receives a radio wave through the Global Positioning System (GPS) through an antenna 103. The GPS unit 109 calculates location information on the basis of the received radio wave and outputs it to the controller 106.

The display 110 includes a liquid crystal display, organic electroluminescence (EL) display, or the like and shows display data received from the controller 106.

The operation unit 111 includes a switch key, a location input device disposed on the display 110, such as a touch sensor, or the like and outputs information inputted by the user to the controller 106.

Figure 4:
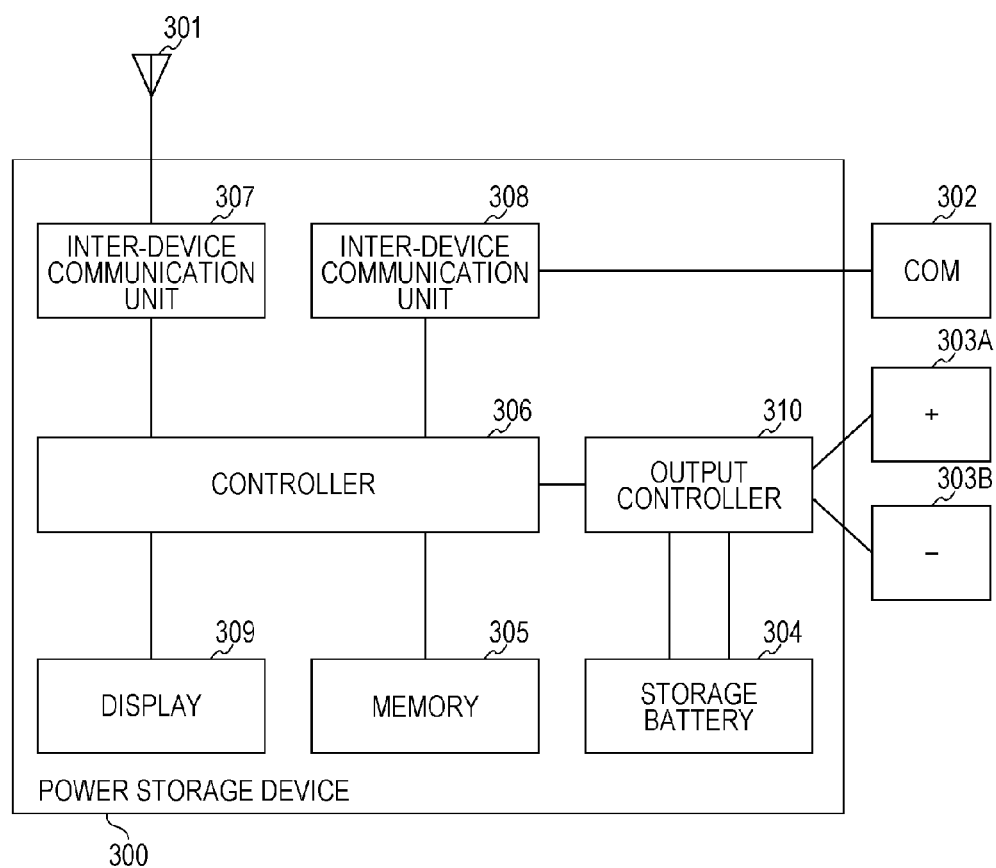
FIG. 4 is a block diagram showing the configuration of the power storage device according to the first embodiment.

FIG. 4 is a block diagram showing the configuration of the power storage device 300 according to the first embodiment.

The power storage device 300 includes an antenna 301, a communication terminal 302, a positive terminal 303A and negative terminal 303B for a power source, a storage battery 304, a memory 305, a controller 306, an inter-device wireless communication unit 307, an inter-device wired communication unit 308, a display 309, and an output controller 310.

The storage battery 304 is the power source of elements that require power in the power storage device 300. It is also a power source that is connected to the positive terminal 303A and negative terminal 303B and supplies the driving power to a motor-driven moving object, such as the power-assisted bicycle 500. Note that FIG. 4 shows only power lines connecting the storage battery 304 and output controller 310 of power lines connected to the storage battery 304 for simplicity.

The memory 305 is a memory for storing control programs, application programs, or the like.

The controller 306 performs various types of control and computing on the entire power storage device 300. It also temporarily stores information acquired from outside or the like, an intermediate or final result of computing, or the like in the memory 105. The controller 306 of the first embodiment performs a storage battery output control process (to be discussed later with reference to FIG. 6) in conjunction with other elements of the power storage device 300.

The storage battery output control process performed by the controller 306 of the first embodiment will be briefly described below.

When the controller 306 receives an output power control command from the mobile terminal 100, it causes the output controller 310 to intermittently output the driving power from the storage battery 304 to the motor 512 of the power-assisted bicycle 500.

Also, when the controller 306 receives an output power control stop command from the mobile terminal 100, it causes the output controller 310 to stop intermittently outputting the driving power from the storage battery 304 to the motor 512 of the power-assisted bicycle 500.

The inter-device wireless communication unit 307 wirelessly communicates with a device, such as the mobile terminal 100, through the antenna 301. Examples of the wireless communication include Bluetooth® and WiFi®. The inter-device communication unit 307 performs encoding, modulation, or the like on data from the controller 306 and transmits the resulting data to a device, such as the mobile terminal 100. The inter-device communication unit 307 also performs demodulation or decoding on data received from a device, such as the mobile terminal 100, and outputs the resulting data to the controller 306.

The inter-device wired communication unit 308 performs encoding, modulation, or the like on data from the controller 306 and transmits the resulting data to a motor-driven moving object connected to the communication terminal 302, such as the power-assisted bicycle 500. The inter-device communication unit 308 also performs demodulation or decoding on data received from a motor-driven moving object connected to the communication terminal 302, such as the power-assisted bicycle 500, and outputs the resulting data to the controller 306.

The display 309 includes, for example, one or more light-emitting diodes (LEDs). The display 309 shows the remaining capacity of the storage battery 304 using the number of lighting LEDs or the like on the basis of data from the controller 306.

The output controller 310 controls the output power of the storage battery 304 under the control of the controller 306.

Figure 5:
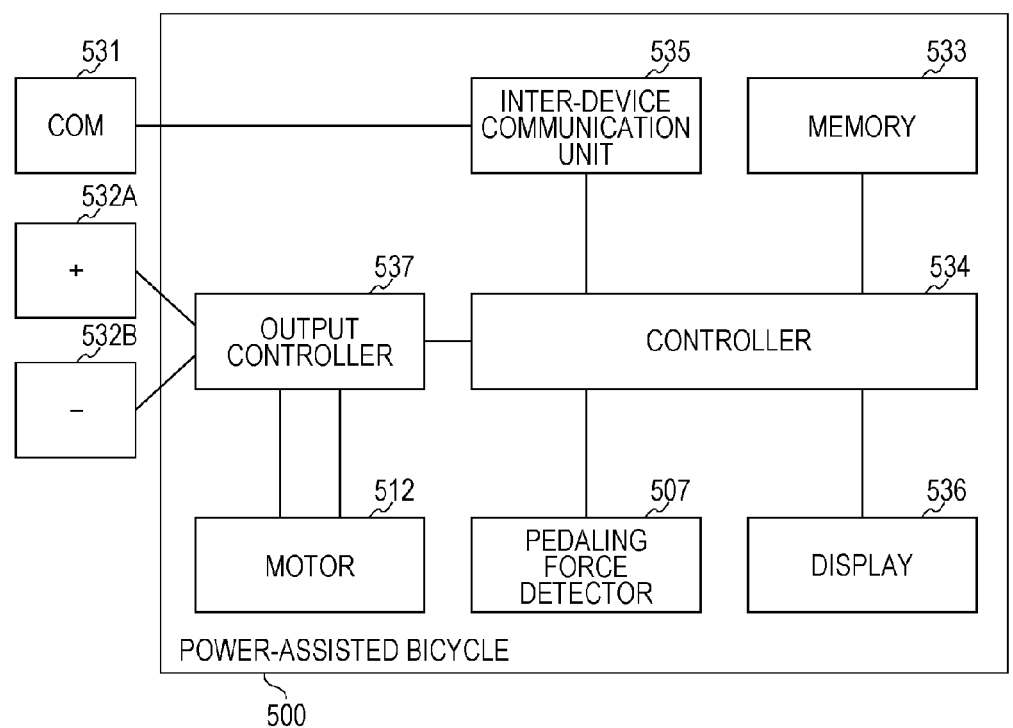
FIG. 5 is a block diagram showing the configuration of a power-assisted bicycle according to the first embodiment.

FIG. 5 is a block diagram showing the configuration of the power-assisted bicycle 500 according to the first embodiment.

The power-assisted bicycle 500 includes a communication terminal 531, a positive terminal 532A and a negative terminal 532B for a power source, a memory 533, a controller 534, an inter-device wired communication unit 535, a display 536, a pedaling force detector 507, an output controller 537, and a motor 512.

Note that FIG. 5 shows only power lines connecting the positive terminal 532A or negative terminal 532B and the output controller 537 of power lines connected to the positive terminal 532A and negative terminal 532B for simplicity.

The memory 533 is a memory for storing control programs, application programs, or the like.

The controller 534 performs various types of control and computing on the entire power-assisted bicycle 500. It also temporarily stores information acquired from outside or the like, an intermediate or final result of computing, or the like in the memory 105.

The inter-device wired communication unit 535 performs encoding, modulation, or the like on data from the controller 534 and transmits the resulting data to a device connected to the communication terminal 531, such as the power storage device 300. The inter-device communication unit 535 also performs demodulation or decoding on data received from a device connected to the communication terminal 531, such as the power storage device 300, and outputs the resulting data to the controller 534.

The display 536 includes a liquid crystal display, organic EL display, or the like and shows display data received from the controller 534.

The output controller 537 controls the output of power supplied from the positive terminal 532A and negative terminal 532B under the control of the controller 534. For example, the output controller 537 controls the output on the basis of a value detected by the pedaling force detector 507 under the control of the controller 534.

A storage battery output control process performed by the mobile terminal 100 and power storage device 300 will be described in turn below.

Figure 6:
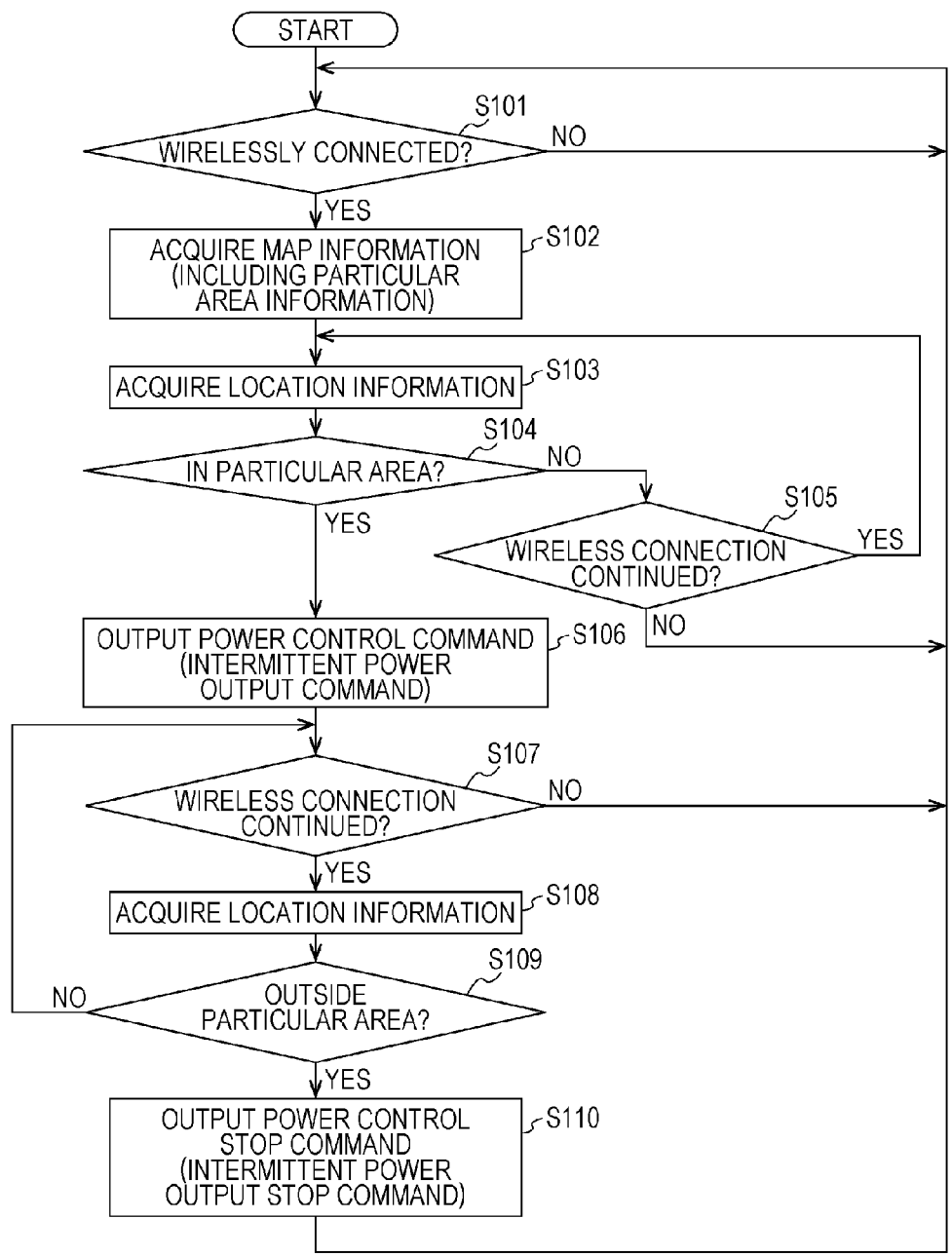
FIG. 6 is a flowchart showing a storage battery output control process performed by the mobile terminal in FIG. 3.

FIG. 6 is a flowchart showing a storage battery output control process performed by the mobile terminal 100 in FIG. 3.

The inter-device communication unit 108 searches for and authenticates the power storage device 300, which is paired with the mobile terminal 100, through the antenna 102 and attempts to wirelessly connect with the power storage device 300 (step S101). If the inter-device communication unit 108 has yet to wirelessly connect with the power storage device 300 (S101: NO), step S101 is repeated. If the inter-device communication unit 108 has wirelessly connected (S101: YES), the controller 106 acquires map information including particular area information from the server in the cloud through the communication unit 101 and network communication unit 107 (step S102).

The controller 106 may previously acquire map information, or may repeatedly acquire map information about a predetermined range including the location of the mobile terminal 100.

The GPS unit 109 acquires the location information of the mobile terminal 100 (step S103).

The controller 106 determines whether the mobile terminal 100 is within a particular area, that is, the user is driving the power-assisted bicycle 500 within a particular area, on the basis of the particular area information and location information (step S104).

If it determines that the user is not driving the power-assisted bicycle 500 within a particular area (S104: NO), the controller 106 determines whether the wireless connection between the mobile terminal 100 and power storage device 300 is continued (step 105). If the controller 106 determines that the wireless connection is continued (S105: YES), step S103 is performed. In contrast, if the controller 106 determines that the wireless connection is not continued, that is, the wireless connection is shut down (S105: NO), step S101 is performed.

If it determines that the user is driving the power-assisted bicycle 500 within a particular area (S104: YES), the controller 106 transmits an output power control command (intermittent driving power output command) signal to the power storage device 300 through the inter-device communication unit 108 and antenna 102 (step S106). The power storage device 300 receives the output power control command signal and intermittently outputs the driving power from the storage battery 304 to the motor 512 of the power-assisted bicycle 500 on the basis of the output power control command. When the driving power is intermittently supplied to the motor 512, the power-assisted bicycle 500 operates discontinuously. Due to the discontinuous operation of the power-assisted bicycle 500, the user can recognize that he or she is riding the power-assisted bicycle 500 within the particular area.

The controller 106 determines whether the wireless connection between the mobile terminal 100 and power storage device 300 is continued (step 107).

If the controller 106 determines that the wireless connection is not continued (S107: NO), step S101 is performed.

There are cases in which the wireless connection is shut down in a particular area, including a case in which the user stops the power-assisted bicycle 500 in the bicycle parking lot of a supermarket and leaves the power-assisted bicycle 500. In such a case, the mobile terminal 100 cannot wirelessly command the power storage device 300 to stop intermittently outputting the power. For this reason, if the wireless connection is shut down while the power storage device 300 is intermittently outputting the driving power, the power storage device 300 stops intermittently outputting the driving power without receiving a command from the mobile terminal 100 (see step S308 in FIG. 7).

If the controller 106 determines that the wireless connection is continued (S107: YES), the GPS unit 109 acquires the location information of the mobile terminal 100 (step S108).

The controller 106 then determines whether the mobile terminal 100 is outside the particular area, that is, the user driving the power-assisted bicycle 500 has gone out of the particular area, on the basis of the particular area information and location information (step S109).

If the controller 106 determines that the user driving the power-assisted bicycle 500 has yet to go out of the particular area (S109: NO), step S107 is performed.

If it determines that that the user driving the power-assisted bicycle 500 has gone out of the particular area (S109: YES), the controller 106 transmits an output power control stop command (intermittent driving power output stop command) signal to the power storage device 300 through the inter-device communication unit 108 and antenna 102 (step S110). The power storage device 300 receives the output power control stop command signal and stops intermittently outputting the driving power from the storage battery 304 to the motor 512 of the power-assisted bicycle 500 on the basis of the output power control stop command. When the intermittent supply of the driving power to the motor 512 is stopped, the power-assisted bicycle 500 stops operating discontinuously. When the power-assisted bicycle 500 stops operating discontinuously, the user can recognize that he or she has gone out of the particular area.

Figure 7:
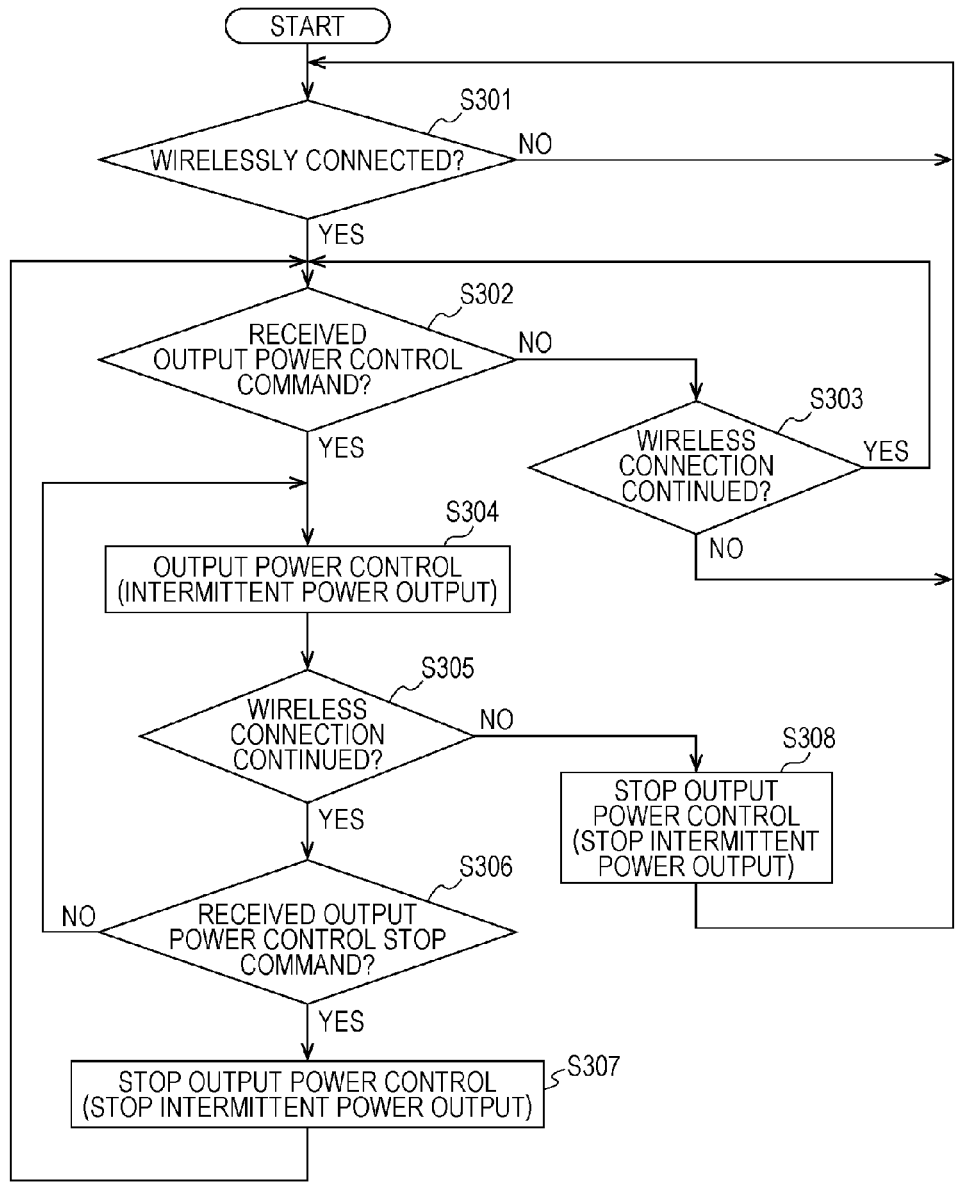
FIG. 7 is a flowchart showing a storage battery output control process performed by the power storage device in FIG. 4.

FIG. 7 is a flowchart showing a storage battery output control process performed by the power storage device 300 in FIG. 4.

The inter-device communication unit 307 searches for and authenticates the mobile terminal 100, which is paired with the power storage device 300, through the antenna 301 and attempts to wirelessly connect with the power storage device 100 (step S301). If the inter-device communication unit 307 has yet to wirelessly connect with the mobile terminal 100 (S301: NO), step S301 is repeated.

If the inter-device communication unit 307 has wirelessly connected (S301: YES), the controller 306 determines whether the power storage device 300 has received an output power control command (intermittent driving power output command) signal from the mobile terminal 100 through the antenna 301 and inter-device communication unit 307 (step S302).

If it determines that an output power control command has not been received (S302: NO), the controller 306 determines whether the wireless connection between the power storage device 300 and mobile terminal 100 is continued (step S303). If the controller 306 determines that the wireless connection is continued (S303: YES), step S302 is performed. In contrast, if the controller 306 determines that the wireless connection is not continued (S303: NO), step S301 is performed.

If it determines that an output power control command signal has been received (S302: YES), the controller 306 causes the output controller 310 to intermittently output the driving power from the storage battery 304 to the motor 512 of the power-assisted bicycle 500 (step S304). When the driving power is intermittently supplied to the motor 512, the power-assisted bicycle 500 operates discontinuously.

The controller 306 then determines whether the wireless connection between the power storage device 300 and mobile terminal 100 is continued (step S305).

If it determines that the wireless connection is continued (S305: YES), the controller 306 determines whether the power storage device 300 has received an output power control stop command (intermittent driving power output stop command) signal from the mobile terminal 100 through the antenna 301 and inter-device communication unit 307 (step S306).

If the controller 306 determines that an output power control command stop signal has not been received (S306: NO), step S304 is performed.

In contrast, if it determines that an output power control stop command has been received (S306: YES), the controller 306 causes the output controller 310 to stop intermittently outputting the driving power from the storage battery 304 to the motor 512 of the power-assisted bicycle 500 (step S307). When the intermittent supply of the driving power to the motor 512 is stopped, the power-assisted bicycle 500 stops operating discontinuously.

If it determines that the wireless connection is not continued (S305: NO), the controller 306 causes the output controller 310 to stop intermittently outputting the driving power from the storage battery 304 to the motor 512 of the power-assisted bicycle 500 (step S308). When the intermittent supply of the driving power to the motor 512 is stopped, the power-assisted bicycle 500 stops operating discontinuously. Note that if the wireless connection is shut down in the particular area, the power storage device 300 cannot wirelessly receive an intermittent driving power output stop command from the mobile terminal 100. For this reason, if the wireless connection is shut down while the power storage device 300 is intermittently outputting the power, the power storage device 300 stops intermittently outputting the driving power without receiving a command from the mobile terminal 100.

An example of associated operations performed by the mobile terminal 100, power storage device 300, and power-assisted bicycle 500 according to the first embodiment will be described below.

Figure 8:
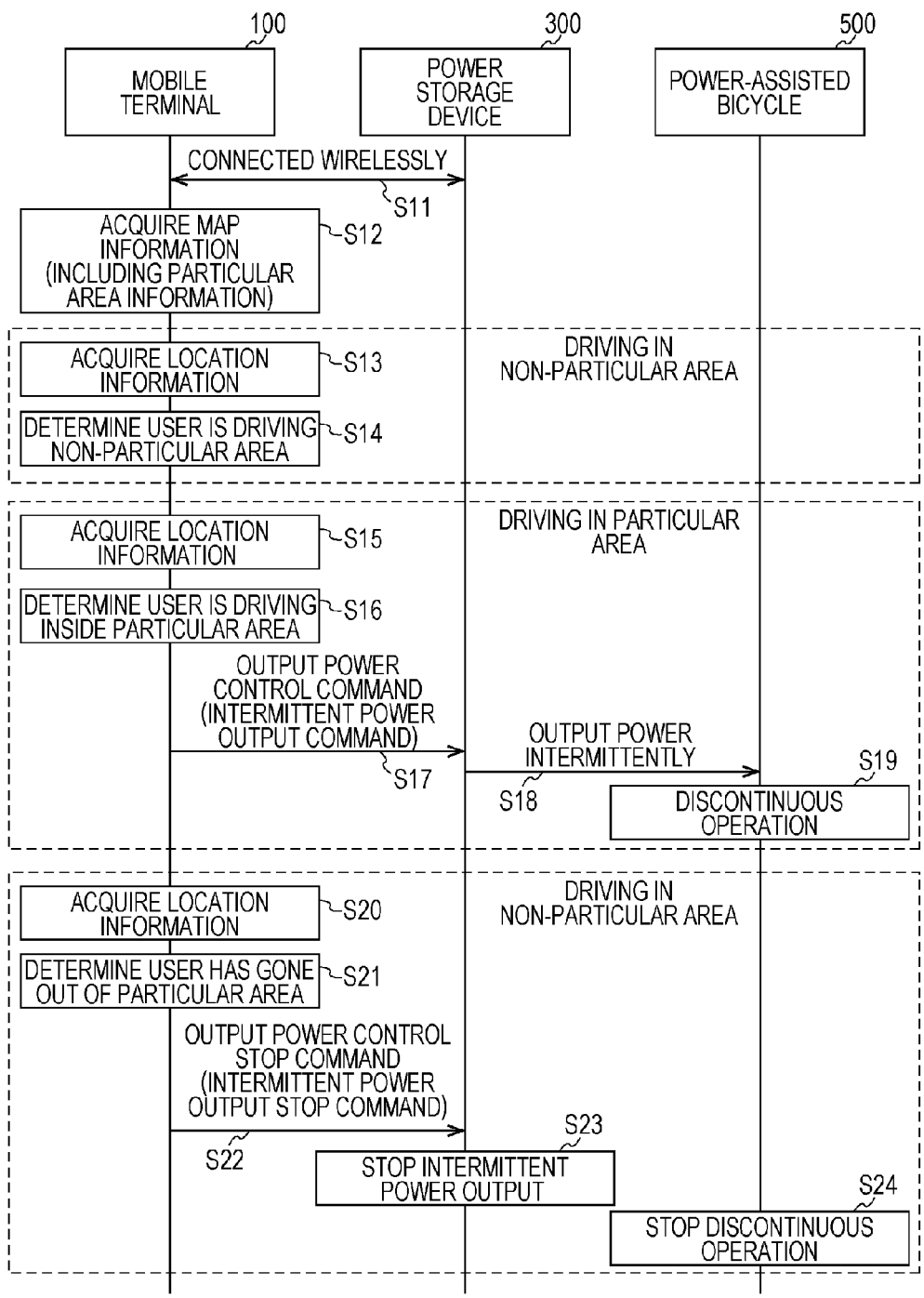
FIG. 8 is a sequence diagram showing an example of associated operations performed by the mobile terminal, power storage device, and power-assisted bicycle of the first embodiment.

FIG. 8 is a sequence diagram showing an example of associated operations performed by the mobile terminal 100, power storage device 300, and power-assisted bicycle 500 according to the first embodiment. Note that FIG. 8 is a sequence diagram of a case in which the user starts to drive the power-assisted bicycle in an area which is not a particular area, enters a particular area, and then goes out of the particular area.

When the user carrying the mobile terminal 100 rides and drives the power-assisted bicycle 500, the mobile terminal 100 and power storage device 300, which are previously paired, approach each other and thus wirelessly connect with each other (step S11).

The mobile terminal 100 acquires map information including particular area information from the server in the cloud (step S12).

Here, assume that the user is driving the power-assisted bicycle 500 in an area which is not a particular area.

The mobile terminal 100 acquires the location information of the mobile terminal 100 using GPS (step S13). The mobile terminal 100 then determines whether the user is driving the power-assisted bicycle 500 within a particular area, on the basis of the particular area information and location information and determines that the user is driving in an area which is not a particular area (step S14).

Here, assume that the user driving the power-assisted bicycle 500 has entered a particular area.

The mobile terminal 100 acquires the location information of the mobile terminal 100 using GPS (step S15). The mobile terminal 100 then determines whether the user is driving the power-assisted bicycle 500 within a particular area, on the basis of the particular area information and location information and determines that the user is driving in a particular area (step S16).

The mobile terminal 100 transmits an output power control command (intermittent driving power output command) signal to the power storage device 300 (step S17). This command is an example of a driving power reduction command of the present disclosure.

The power storage device 300 receives the output power control command signal and intermittently outputs the driving power from the storage battery 304 to the motor 5 of the power-assisted bicycle 500 on the basis of the received output power control command (step S18). Thus, the power-assisted bicycle 500 operates discontinuously (step S19).

Note that during traveling within a single particular area, the mobile terminal 100 transmits an output power control command signal to the power storage device 300 once.

Alternatively, each time it determines that the electric bicycle 500 is within a particular area, the mobile terminal 100 may transmit an output power control command signal. In this case, the mobile terminal 100 need not transmit an output power control stop command signal to the power storage device 300. The power storage device 300 may stop intermittently outputting the driving power to the motor 512 of the power-assisted bicycle 500 if it has not received an output power control command signal for a predetermined period.

Here, assume that the user driving the power-assisted bicycle 500 has gone out of the particular area.

The mobile terminal 100 acquires the location information of the mobile terminal 100 using GPS (step S20). The mobile terminal 100 then determines whether the user driving the power-assisted bicycle 500 has gone out of the particular area, on the basis of the particular area information and location information and determines that the user has gone out of the particular area (step S21).

The mobile terminal 100 then transmits an output power control stop command (intermittent driving power output stop command) signal to the power storage device 300 (step S22).

The power storage device 300 receives the output power control stop command signal and stops intermittently outputting the driving power from the storage battery 304 to the motor 512 of the power-assisted bicycle 500 on the basis of the received output power control stop command (step S23). Thus, the power-assisted bicycle 500 stops operating discontinuously (step S24).

According to the first embodiment described above, when the user drives the power-assisted bicycle 500 within a particular area, the power-assisted bicycle 500 operates discontinuously. Due to this discontinuous operation, the user can recognize that he or she is driving in the particular area. As a result, the user can drive the power-assisted bicycle 500 in the particular area with the utmost caution. Thus, for example, the user can prevent the collision with a moving object, such as an automobile or bicycle, or human.

Second Embodiment

In the first embodiment, the mobile terminal 100 acquires map information including particular area information from the server in the cloud and repeatedly acquires the location information of the mobile terminal 100 using GPS. The mobile terminal 100 then determines whether the user is driving the power-assisted bicycle 500 within a particular area, on the basis of the particular area information and location information. If it determines that the user is driving in a particular area, the mobile terminal 100 transmits an output power control command signal to the power storage device 300. The power storage device 300 receives the output power control command signal and intermittently outputs the driving power from the storage battery 304 to the motor 512 of the power-assisted bicycle 500.

In a second embodiment, on the other hand, a mobile terminal 100 acquires map information including particular area information from a server in a cloud and transmits the map information to a power storage device 300. The mobile terminal 100 also repeatedly acquires the location information of the mobile terminal 100 using GPS and transmits it to the power storage device 300. The power storage device 300 determines whether the user is driving a power-assisted bicycle 500 within a particular area, on the basis of the particular area information and location information. If it determines that the user is driving in a particular area, the power storage device 300 intermittently outputs the driving power from the storage battery 304 to the motor 512 of the power-assisted bicycle 500.

The second first embodiment of the present disclosure will be described below with reference to the drawings.

The configurations of the mobile terminal 100, power storage device 300 and power-assisted bicycle 500 are substantially the same as those in FIGS. 3 to 5.

A controller 106 of the mobile terminal 100 of the second embodiment performs a storage battery output control process (to be discussed later with reference to FIG. 9) in conjunction with other elements of the mobile terminal 100.

The storage battery output control process performed by the controller 106 of the second embodiment will be briefly described below.

The controller 106 transmits map information including particular area information received from the server in the cloud to the power storage device 300. The controller 106 also transmits location information repeatedly acquired by a GPS unit 109 to the power storage device 300.

A controller 306 of the power storage device 300 of the second embodiment performs a storage battery output control process (to be discussed later with reference to FIG. 10) in conjunction with other elements of the power storage device 300.

The storage battery output control process performed by the controller 306 of the second embodiment will be briefly described below.

The controller 306 determines whether the mobile terminal 100 is within a particular area, that is, the user is driving the power-assisted bicycle 500 within a particular area, on the basis of the particular area information included in the map information received from the mobile terminal 100 and the location information repeatedly received from the mobile terminal 100. If it determines that the user is driving the power-assisted bicycle 500 within a particular area, the controller 306 causes an output controller 310 to intermittently output the driving power from the storage battery 304 to the motor 512 of the power-assisted bicycle 500.

While the driving power is intermittently outputted, the controller 306 determines whether the mobile terminal 100 is outside the particular area, that is, the user driving the power-assisted bicycle 500 has gone out of the particular area, on the basis of the particular area information and the repeatedly received location information. If it determines that the user driving the power-assisted bicycle 500 has gone out of the particular area, the controller 306 causes the output controller 310 to stop intermittently outputting the driving power from the storage battery 304 to the motor 512 of the power-assisted bicycle 500.

The storage battery output control process performed by the mobile terminal 100 and power storage device 300 will be described in turn below.

Figure 9:
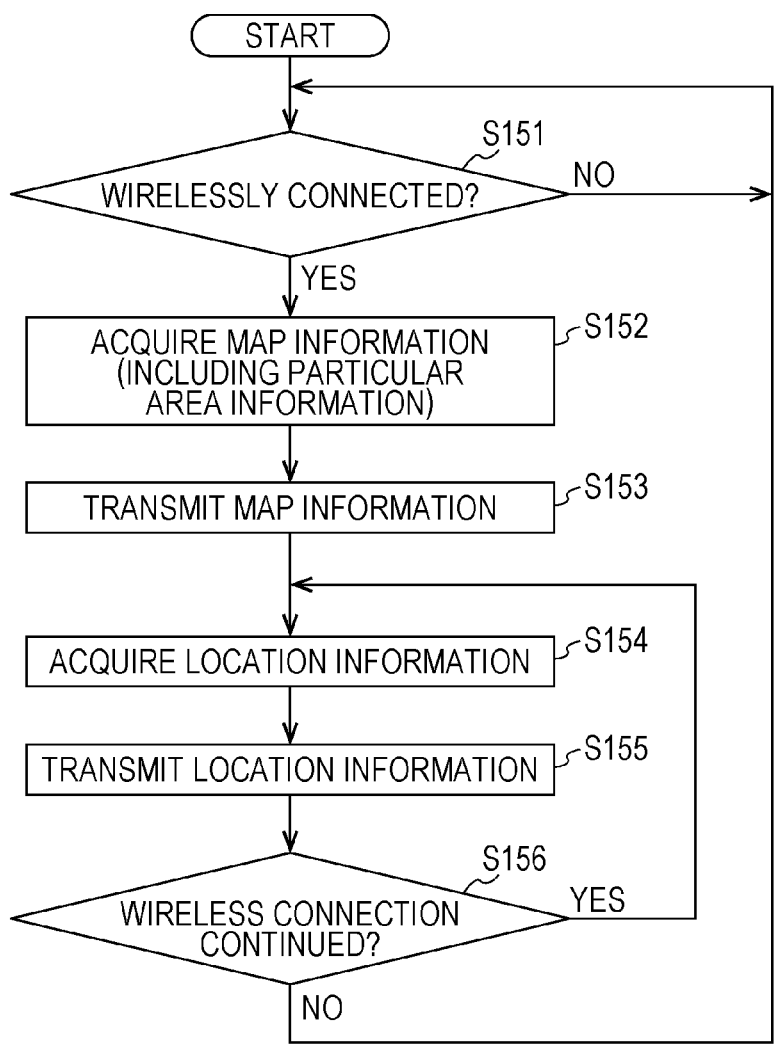
FIG. 9 is a flowchart showing a storage battery output control process performed by a mobile terminal according to a second embodiment.

FIG. 9 is a flowchart showing the storage battery output control process performed by the mobile terminal 100 of the second embodiment.

An inter-device communication unit 108 searches for and authenticates the power storage device 300, which is paired with the mobile terminal 100, through an antenna 102 and attempts to wirelessly connect with the power storage device 300 (step S151). If the inter-device communication unit 108 has yet to wirelessly connect with the power storage device 300 (S151: NO), step S151 is repeated. If the inter-device communication unit 108 has wirelessly connected (S151: YES), the controller 106 acquires map information including particular area information from the server in the cloud through an antenna 101 and a network communication unit 107 (step S152). The controller 106 then transmits the map information including the particular area information to the power storage device 300 through the inter-device communication unit 108 and antenna 102 (step S 153).

The GPS unit 109 acquires the location information of the mobile terminal 100 (step S154). The controller 106 transmits the location information of the mobile terminal 100 to the power storage device 300 through the inter-device communication unit 108 and antenna 102 (step S155).

The controller 106 then determines whether the wireless connection between the mobile terminal 100 and power storage device 300 is continued (step 156). If the controller 106 determines that the wireless connection is continued (S156: YES), step S154 is performed. In contrast, if the controller 106 determines that the wireless connection is not continued, that is, the wireless connection is shut down (S156: NO), step S151 is performed.

Figure 10:
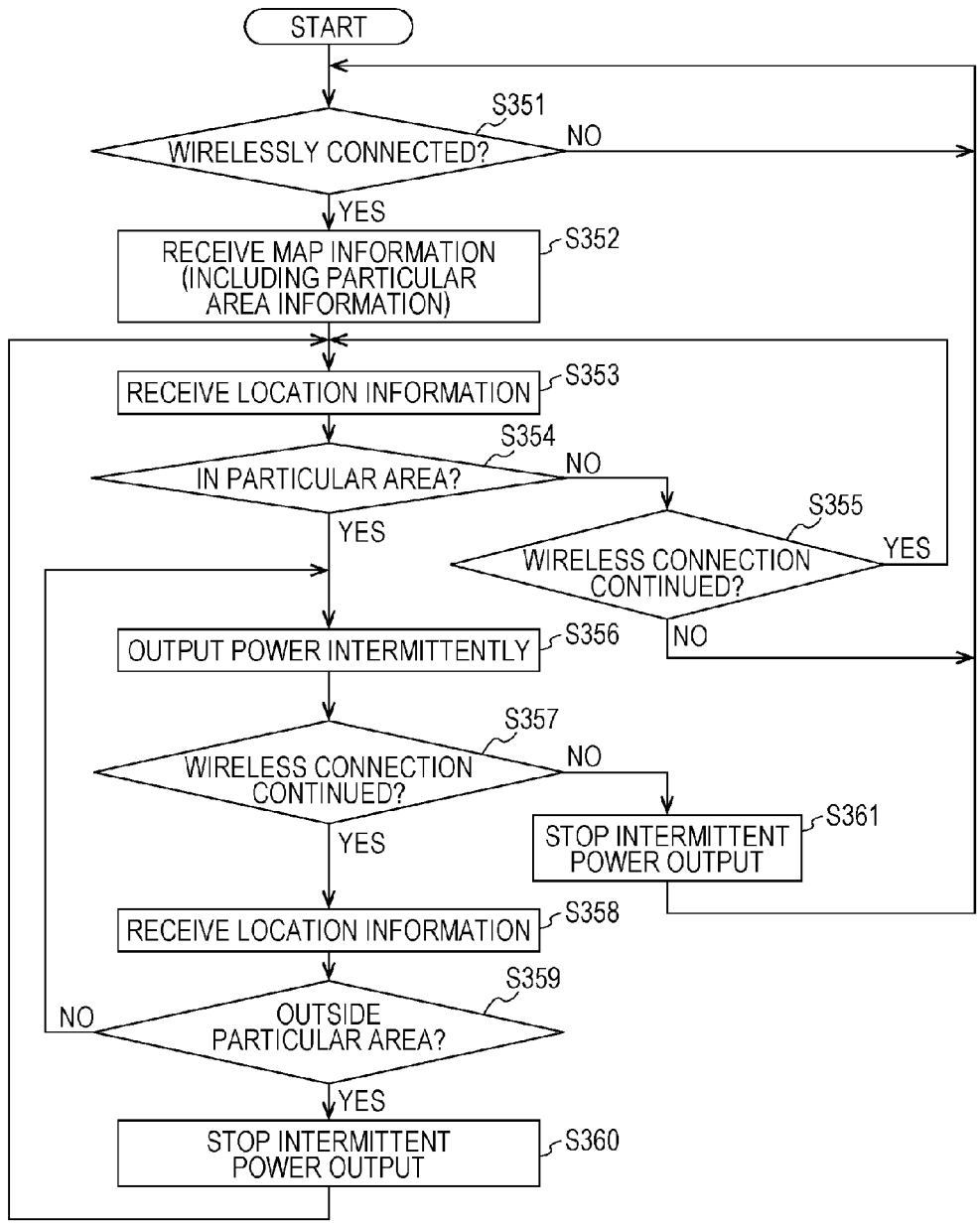
FIG. 10 is a flowchart showing a storage battery output control process performed by a power storage device according to the second embodiment.

FIG. 10 is a flowchart showing the storage battery output control process performed by the power storage device 300 of the second embodiment.

An inter-device communication unit 307 searches for and authenticates the mobile terminal 100, which is paired with the power storage device 300, through an antenna 301 and attempts to wirelessly connect with the mobile terminal 100 (step S351). If the inter-device communication unit 307 has yet to wirelessly connect with the mobile terminal 100 (S351: NO), step S351 is repeated.

If the inter-device communication unit 307 has wirelessly connected (S351: YES), the controller 306 receives the map information including the particular area information from the mobile terminal 100 through the antenna 301 and inter-device communication unit 307 (step S352).

The controller 306 also receives the location information of the mobile terminal 100 from the mobile terminal 100 through the antenna 301 and inter-device communication unit 307 (step S353). The controller 306 then determines whether the mobile terminal 100 is within a particular, that is, the user is driving the power-assisted bicycle 500 within a particular area, on the basis of the particular area information and location information (step S354).

If it determines that the user is not driving the power-assisted bicycle 500 within a particular area (S354: NO), the controller 306 determines whether the wireless connection between the mobile terminal 100 and power storage device 300 is continued (step 355). If the controller 306 determines that the wireless connection is continued (S355: YES), step S353 is performed. In contrast, if the controller 306 determines that the wireless connection is not continued (S355: NO), step S351 is performed.

If it determines that the user is driving the power-assisted bicycle 500 within a particular area (S354: YES), the controller 306 causes the output controller 310 to intermittently output the driving power from the storage battery 304 to the motor 512 of the power-assisted bicycle 500 (step S356). When the driving power is intermittently supplied to the motor 512, the power-assisted bicycle 500 operates discontinuously. Due to the discontinuous operation of the power-assisted bicycle 500, the user can recognize that he or she is riding the power-assisted bicycle 500 within the particular area.

The controller 306 then determines whether the wireless connection between the mobile terminal 100 and power storage device 300 is continued (step S357).

If it determines that the wireless connection is continued (S357: YES), the controller 306 receives the location information of the mobile terminal 100 from the mobile terminal 100 through the antenna 301 and inter-device communication unit 307 (step S358). The controller 306 then determines whether the mobile terminal 100 is outside the particular area, that is, the user driving the power-assisted bicycle 500 has gone out of the particular area, on the basis of the particular area information and location information (step S359).

If the controller 306 determines that the user driving the power-assisted bicycle 500 has yet to go out of the particular area (S359: NO), step S356 is performed.

In contrast, if it determines that the user driving the power-assisted bicycle 500 has gone out of the particular area (S359: YES), the controller 306 causes the output controller 310 to stop intermittently outputting the driving power from the storage battery 304 to the motor 512 of the power-assisted bicycle 500 (step S360). When the intermittent supply of the driving power to the motor 512 is stopped, the power-assisted bicycle 500 stops operating discontinuously.

If it determines that the wireless connection is not continued (S357: NO), the controller 306 causes the output controller 310 to stop intermittently outputting the driving power from the storage battery 304 to the motor 512 of the power-assisted bicycle 500 (step S361). When the intermittent supply of the driving power to the motor 512 is stopped, the power-assisted bicycle 500 stops operating discontinuously. Note that if the wireless connection is shut down in the particular area, for example, if the power-assisted bicycle 500 is within the particular area but the user has left the power-assisted bicycle 500, there is no need to cause the power-assisted bicycle 500 to operate discontinuously. In this case, step S361 is performed.

An example of associated operations performed by the mobile terminal 100, power storage device 300, and power-assisted bicycle 500 of the second embodiment will be described below.

Figure 11:
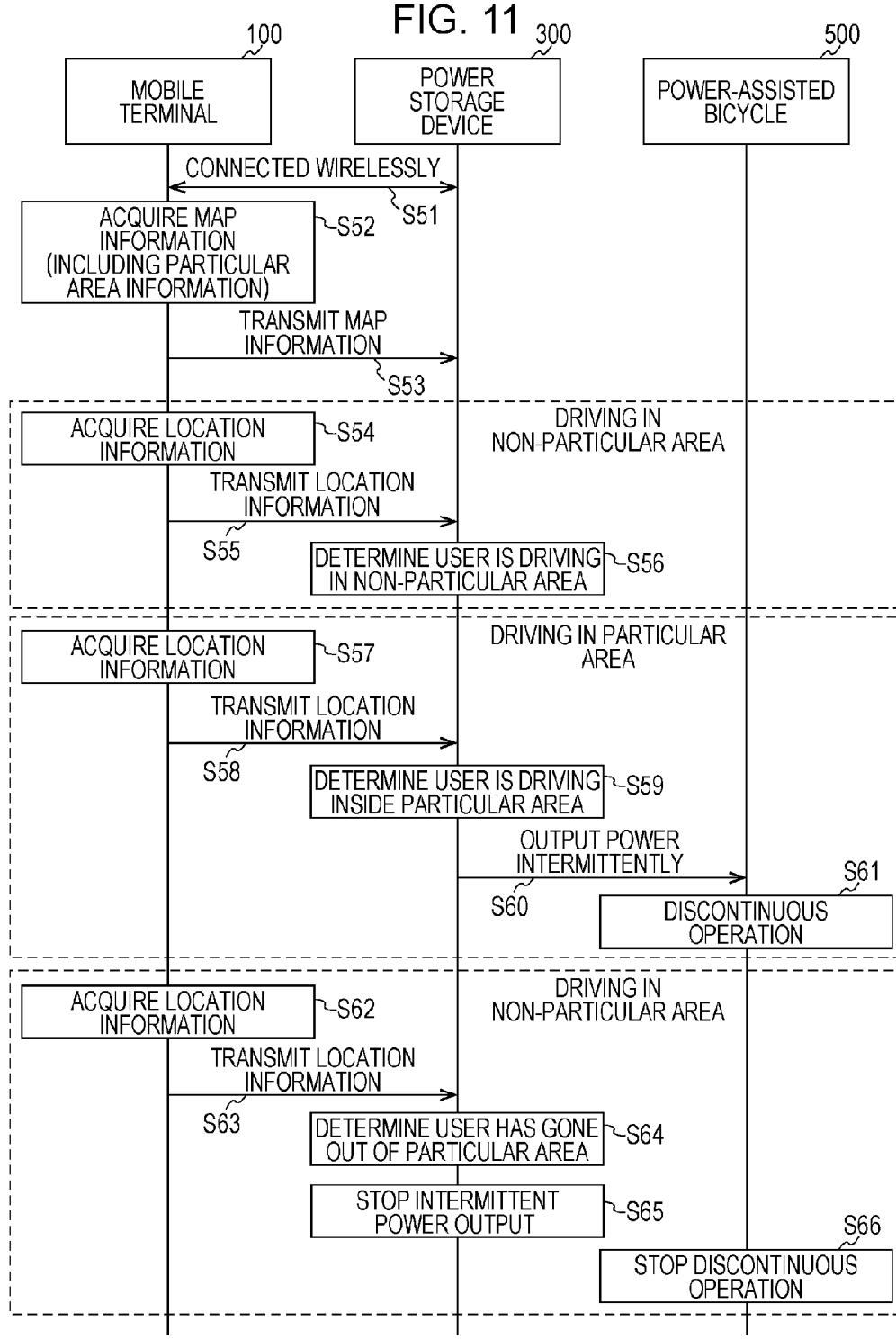
FIG. 11 is a sequence diagram showing an example of associated operations performed by the mobile terminal, the power storage device, and a power-assisted bicycle of the second embodiment.

FIG. 11 is a sequence diagram showing an example of associated operations performed by the mobile terminal 100, power storage device 300, and power-assisted bicycle 500 of the second embodiment. Note that FIG. 11 is a sequence diagram of a case in which the user starts to drive the power-assisted bicycle in an area which is not a particular area, enters a particular area, and then goes out of the particular area.

When the user carrying the mobile terminal 100 rides and drives the power-assisted bicycle 500, the mobile terminal 100 and power storage device 300, which are previously paired, approach each other and thus wirelessly connect with each other (step S51).

The mobile terminal 100 acquires map information including particular area information from the server in the cloud (step S52) and transmits the acquired map information including the particular area information to the power storage device 300 (step S53).

Here, assume that the user is driving the power-assisted bicycle 500 in an area which is not a particular area.

The mobile terminal 100 acquires the location information of the mobile terminal 100 using GPS (step S54) and transmits it to the power storage device 300 (step S55). In other words, step S55 is a step of acquiring information about the location of the motor-driven moving object from the mobile terminal.

The power storage device 300 determines whether the user is driving the power-assisted bicycle 500 within a particular area, on the basis of the particular area information and location information and determines that the user is driving in an area which is not a particular area (step S56). In other words, step S56 is a step of determining whether the motor-driven moving object is within a particular area, on the basis of information about the location of the motor-driven moving object.

Here, assume that the user driving the power-assisted bicycle 500 has entered a particular area.

The mobile terminal 100 acquires the location information of the mobile terminal 100 using GPS (step S57) and transmits it to the power storage device 300 (step S58). In other words, step S58 is a step of acquiring information about the location of the motor-driven moving object from the mobile terminal.

The power storage device 300 determines whether the user is driving the power-assisted bicycle 500 within a particular area, on the basis of the particular area information and location information and determines that the user is driving in a particular area (step S59). In other words, step S59 is a step of determining whether the motor-driven moving object is within a particular area, on the basis of the information about the location of the motor-driven moving object.

The power storage device 300 then intermittently outputs the driving power from storage battery 304 to the motor 512 of the power-assisted bicycle 500 (step S60). Thus, the power-assisted bicycle 500 operates discontinuously (step S61).

Here, assume that the user driving the power-assisted bicycle 500 has gone out of the particular area.

The mobile terminal 100 acquires the location information of the mobile terminal 100 using GPS (step S62) and transmits it to the power storage device 300 (step S63). In other words, step S63 is a step of acquiring information about the location of the motor-driven moving object from the mobile terminal.

The power storage device 300 determines whether the user driving the power-assisted bicycle 500 has gone out of the particular area, on the basis of the particular area information and location information and determines that the user has gone out of the particular area (step S64). In other words, step S64 is a step of determining whether the motor-driven moving object is within the particular area, on the basis of the information about the location of the motor-driven moving object.

The power storage device 300 then stops intermittently outputting the driving power from storage battery 304 to the motor 512 of the power-assisted bicycle 500 (step S65). Thus, the power-assisted bicycle 500 stops operating discontinuously (step S66).

According to the second embodiment described above, when the user is driving the power-assisted bicycle 500 within a particular area, the power-assisted bicycle 500 operates discontinuously. Due to this discontinuous operation, the user can recognize that he or she is driving in the particular area. As a result, the user can drive the power-assisted bicycle 500 in the particular area with the utmost caution. Thus, for example, the user can prevent the collision with a moving object, such as an automobile or bicycle, or human.

Third Embodiment

A third embodiment does not aim to let the user know that the user is driving a power-assisted bicycle in a particular area, unlike the first and second embodiments, but rather is based on the following problem and object.

For example, there is a course having a gentle uphill near the starting point and a steep uphill near the destination.

If the power-assisted bicycle travels such a course while supplying the driving power from the storage battery to the motor on the basis of the pedaling force or the like as is done usually, the power-assisted bicycle may use all the remaining power of the storage battery on the gentle uphill near the starting point in order to drive the motor, depending on the amount of the power remaining in the storage battery (hereafter referred to as "the remaining power amount"). As a result, the user may fail to receive motor-driven assistance on the steep slope near the destination.

For the user, it would be more appropriate to receive the motor-driven assistance on the steep slope than to receive motor-driven assistance on the gentle uphill, since the user could more easily drive the power-assisted bicycle.

However, if the power-assisted bicycle travels the above course as is done usually, the user would fail to receive motor-driven assistance as described above, which is deemed appropriate for the user, depending on the remaining power amount of the storage battery.

For this reason, the third embodiment aims to allow the user to receive motor-driven assistance appropriate for the user on the course leading to the destination.

In the third embodiment, it is assumed that there are two power assist modes.

In one of the power assist modes, the driving power supplied from the storage battery to the motor is controlled on the basis of the pedaling force or the like without considering the course leading the destination and the remaining power amount of the storage battery. Hereafter, this mode will be referred to as "the normal assist mode." Since the normal assist mode is a typical power assist mode, it will not be described in detail in the third embodiment.

In the other power assist mode, the driving power supplied from the storage battery to the motor is controlled considering the course leading the destination and the remaining power amount of the storage battery. Hereafter, this mode will be referred to as "the adjusted assist mode."

Now, the third embodiment of the present disclosure will be described with reference to the drawings.

The configurations of a mobile terminal 100, a power storage device 300, and a power-assisted bicycle 500 may be substantially the same as those in FIGS. 3 to 5.

In the third embodiment, a controller 106 of the mobile terminal 100 performs a power allocation process (to be discussed later with reference to FIG. 17) in conjunction with other elements of the mobile terminal 100.

The power allocation process performed by the controller 106 of the third embodiment will be briefly described below.

The controller 106 calculates the amount of power of the storage battery 304 that the power-assisted bicycle is estimated to use to travel from the starting point to the destination (hereafter referred to as "the estimated required power amount P1"). The starting point is the location of the mobile terminal 100 acquired by the GPS unit 109 at the time point when the paired mobile terminal 100 and power storage device 300 are wirelessly connected. The destination is a location specified by the user using a destination specification screen in FIG. 15 (to be discussed later).

An example of a method for calculating the estimated required power amount P1 will be described below.

Figure 14:
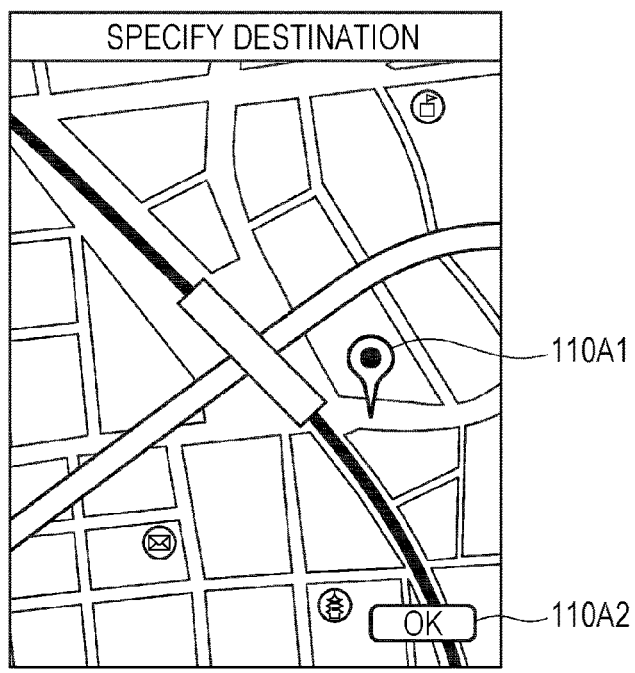
FIG. 14 is a diagram showing an example of a destination specification screen according to the third embodiment.

The controller 106 acquires, from the server in the cloud, (1) map information including gradient information and (2) gradient-power amount relationship information indicating the relationship between the gradient whose example is shown in FIG. 14 and the amount of power of the storage battery 304 that the electric bicycle 500 is assumed to use at the gradient (hereafter referred to as "the gradient used power amount"). The gradient information includes information indicating the gradient of each two-point section in a direction from one point toward the other point. The gradient used power amount is the amount of power used per unit distance with respect to the gradient and is previously set so that the gradient used power amount is increased as the gradient of the uphill is higher.

The controller 106 determines the course from the starting point to the destination on the basis of map information. The controller 106 then divides the course from the starting point to the destination into multiple two-point sections and identifies the gradients of the two-point sections in the traveling direction on the basis of the gradient information considering the course from the starting point to the destination. If the traveling direction is the direction from the one point toward the other point, the gradients described in the gradient information are used as they are. If the traveling direction is a direction from the other point toward the one point, gradients opposite to the gradients described in the gradient information are used.

The controller 106 refers to the gradient-power amount relationship information, multiplies a gradient used power amount (A) corresponding to the gradient of each two-point section in the traveling direction in the course from the starting point to the destination by the distance (B) of the two-point section, and calculates the sum of the multiplication results (A×B). The sum is the estimated required power amount P1.

The method for calculating the estimated required power amount P1 described above is illustrative only.

The controller 106 receives storage battery information including the remaining power amount P2 of the storage battery 304 from the power storage device 300.

Note that the controller 106 need not receive the storage battery information including the remaining power amount P2 of the storage battery 304 and, for example, may receive storage battery information including an index indicating the remaining power amount P2 of the storage battery 304 from the power storage device 300 and then identify the remaining power amount P2 of the storage battery 304 from the received index.

The controller 106 then determines whether the remaining power amount P2 of the storage battery 304 is larger than the estimated required power amount P1 by a threshold Pth or more (P2−P1≥Pth).

If the remaining power amount P2 is larger than the estimated required power amount P1 by the threshold Pth or more and if the user selects the adjusted assist mode, the controller 106 determines the amount of power outputted from the storage battery 304 to the motor 512 with respect to each of the two-point sections of the course from the starting point to the destination (hereafter referred to as "the allocated power amount") so that the user can receive larger motor-driven assistance on a steeper uphill. The adjusted assist mode is specified by the user using a power assist mode screen in FIG. 16 (to be discussed later). The controller 106 then transmits, to the power storage device 300, power allocation pattern information including location information indicating a first point of each two-point section, location information indicating a second point thereof, and information about the allocated power amount from the first point to the second point thereof.

An example of a method for determining the allocated power amounts of the two-point sections is described below.

The controller 106 calculates the allocated power amounts (C) of the two-point sections of the course from the starting point to the destination as follows.

The controller 106 multiplies the gradient used power amount (A) corresponding to the gradient of each two-point section in the traveling direction by the distance (B) of the two-point section and divides the multiplication result (A×B) by the estimated required power amount P1. The controller 106 then multiplies the remaining power amount P2 of the storage battery 304 by the division result ((A×B)/P1). The multiplication result (P2×(A×B)/P1) is the allocated power amount (C) of the two-point section.

The allocated power amount of each two-point section need not be determined as described above and, for example, may be determined as follows.

In modification (1), the allocated power amount of each two-point section may be determined so that the user can receive larger motor-driven assistance on a steeper uphill by performing a weighting calculation so that a two-point section having a steeper uphill is assigned a larger weight.

In modification (2), the controller 106 multiplies the gradient used power amount (A) corresponding to the gradient of each two-point section in the traveling direction by the distance (B) of the two-point section and sums up multiplication results (A×B) in the descending order of two-point sections having a steeper uphill in the traveling direction. Then, until the sum exceeds the amount of power forming a predetermined percentage of the remaining power amount of the storage battery 304 (e.g., the remaining power amount P2×A/100 where A represents the predetermined percentage), the controller 106 determines the allocated power amount (C) of each two-point section as a result (A×B) obtained by the multiplying the gradient used power amount (A) corresponding to the gradient of the two-point section in the traveling direction by the distance (B) of the two-point section. The controller 106 then allocates the remaining power amount (P2×(100−A)/100) of the remaining power amount P2 of the storage battery 304 to the other two-point sections. The allocated power amounts of the other two-point sections are determined, for example, by performing a weight calculation.

If a two-point section has a larger gradient used power amount (A) corresponding to the gradient thereof in the traveling direction, the two-point section has a steeper uphill.

The display 110 of the mobile terminal 100 displays a destination specification screen whose example is shown in FIG. 14 under the control of the controller 106. The user operates the operation unit 111 to move a pin 110A1 to the destination. After moving the pin 110A1 to the destination, the user clicks an "OK" button 110A2. In this way, the user can specify the destination. A map in the destination specification screen can be zoomed in, or the display range thereof can be changed.

Figure 15:
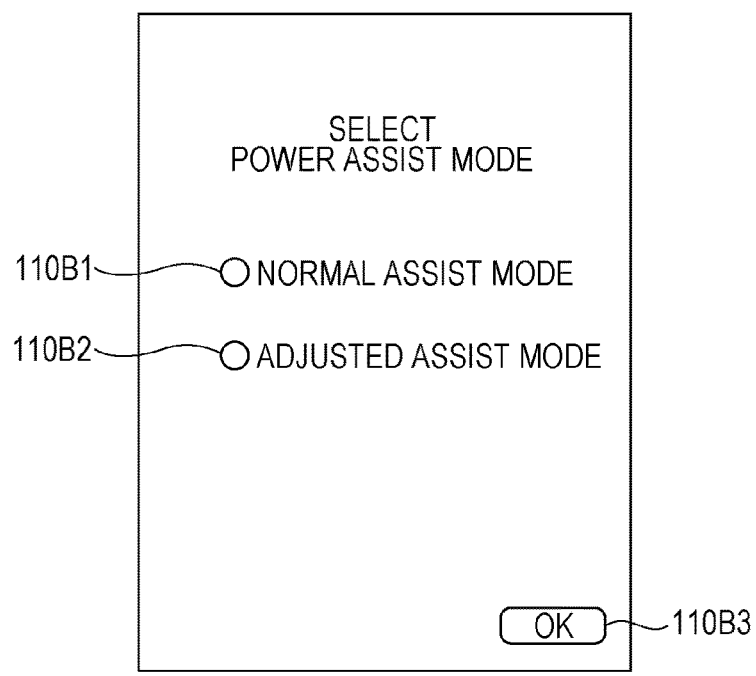
FIG. 15 is a diagram showing an example of a power assist mode selection screen according to the third embodiment.

The display 110 also displays a power assist mode selection screen whose example is shown in FIG. 15 under the control of the controller 106. The user operates the operation unit 111 to check one of radio buttons 110B1 and 110B2. After checking, the user clicks an "OK" button 110B3. In this way, the user can select one of the normal assist mode and adjusted assist mode.

In the third embodiment, a controller 306 of the power storage device 300 performs a power allocation process (to be discussed later with reference to FIG. 18) in conjunction with other elements of the power storage device 300.

The power allocation process performed by the controller 306 of the third embodiment will be briefly described below.

The controller 306 receives power assist mode information indicating the adjusted assist mode from the mobile terminal 100 and also receives power allocation pattern information. The controller 306 also repeatedly acquires the GPS-based location information of the mobile terminal 100 from the mobile terminal 100.

The controller 306 then identifies a two-point section that the user is traveling, of the two-point sections of the course from the starting point to the destination on the basis of the first points and second points in the power allocation pattern information and the location information acquired from the mobile terminal 100. The controller 306 then identifies the allocated power amount of the identified two-point section on the basis of the power allocation pattern information.

On the basis of the identified allocated power amount of the two-point section which the user is traveling, the controller 306 causes the output controller 310 to output the driving power from the storage battery 304 to the motor 512 of the power-assisted bicycle 500.

An example of this power control output method will be described.

The controller 306 estimates the traveling speed of the user on the basis of the GPS-based location information repeatedly acquired from the mobile terminal 100 and estimates the time required to travel the two-point section, on the basis of the distance of the two-point section and the traveling speed. The controller 306 then outputs the allocated power amount of power from the storage battery 304 to the motor 512 over the traveling time.

The time required to travel the two-point section may be previously determined.

Figure 17:
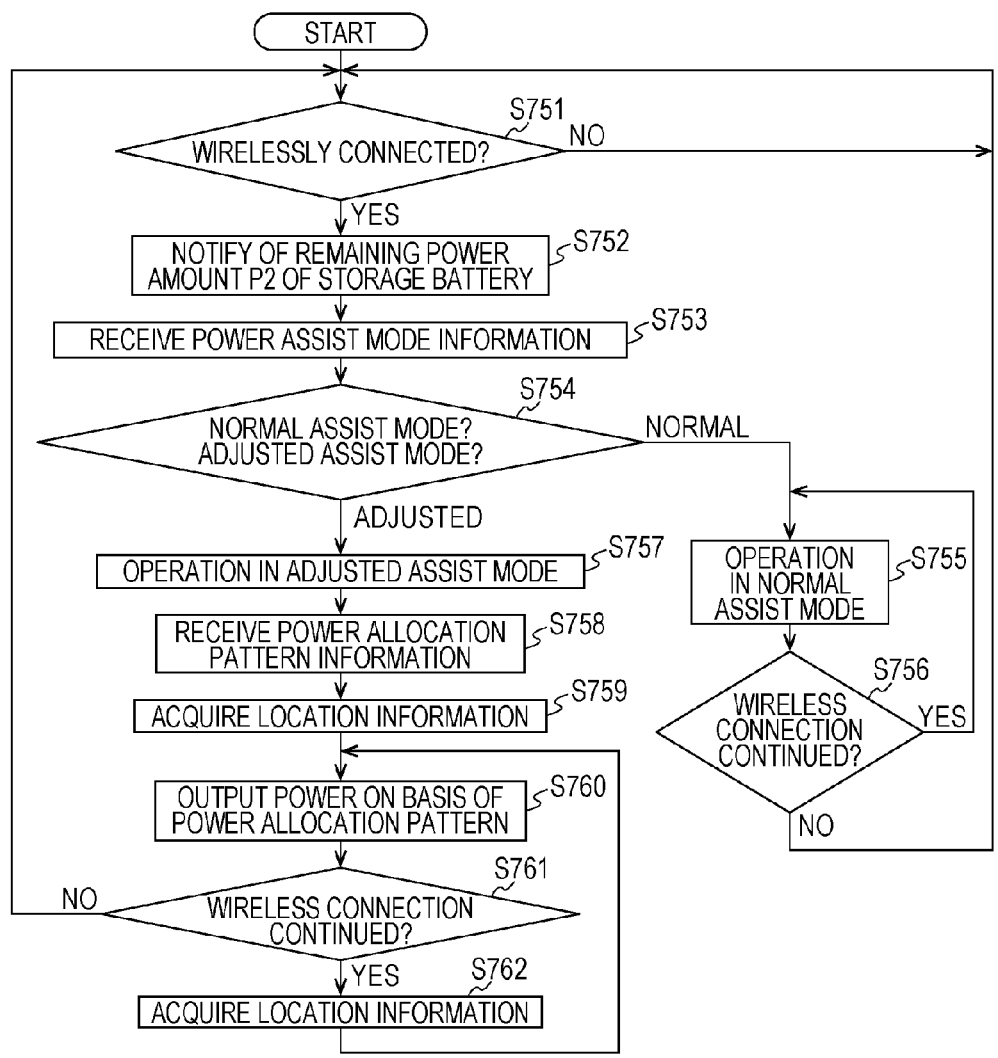
FIG. 17 is a flowchart showing a power allocation process performed by a power storage device according to the third embodiment.

FIG. 17 is a flowchart showing the power allocation process performed by the mobile terminal 100 according to the third embodiment.

An inter-device communication unit 108 searches for and authenticates the power storage device 300, which is paired with the mobile terminal 100, through the antenna 102 and attempts to wirelessly connect with the power storage device 300 (step S701). If the inter-device communication unit 108 has yet to wirelessly connect (S701: NO), step S701 is repeated.

If the inter-device communication unit 108 has wirelessly connected (S701: YES), the controller 106 acquires map information including gradient information and gradient-power amount relationship information whose example is shown in FIG. 13 from the server in the cloud through an antenna 101 and a network communication unit 107 (step S702).

The controller 106 then displays, on the display 110, the destination specification screen whose example is shown in FIG. 14. The user operates the operation unit 111 to specify the destination, and the controller 106 receives destination information indicating the destination from the operation unit 111 (step S703)

The GPS unit 109 acquires the location information of the mobile terminal 100 using GPS (step S704). Note that the location information acquired in step S704 indicates the starting point.

The controller 106 then calculates the estimated required power amount P1 required to travel from the starting point to the destination as described above (step S705).

The controller 106 then inquires of the power storage device 300 about the remaining power amount P2 of the storage battery 304 through the inter-device communication unit 108 and antenna 102. Then, as a response, the controller 106 receives the remaining power amount information indicating the remaining power amount P2 of the storage battery 304 from the power storage device 300 through the antenna 102 and inter-device communication unit 108 (step S706).

The controller 106 then determines whether the remaining power amount P2 of the storage battery 304 is larger than the estimated required power amount P1 by the threshold Pth or more (P2−P1≥Pth) (step S707).

If it determines that the remaining power amount P2 is larger than the estimated required power amount P1 by the threshold Pth or more (S707: YES), the controller 106 transmits power assist mode information indicating the normal assist mode to the power storage device 300 through the inter-device communication unit 108 and antenna 102 (step S708).

The controller 106 then determines whether the wireless connection between the mobile terminal 100 and power storage device 300 is continued (step S709). If the controller 106 determines that the wireless connection is continued (S709: YES), step S709 is repeated. In contrast, if the controller 106 determines that the wireless connection is not continued (S709: NO), step S701 is performed.

Figure 16:
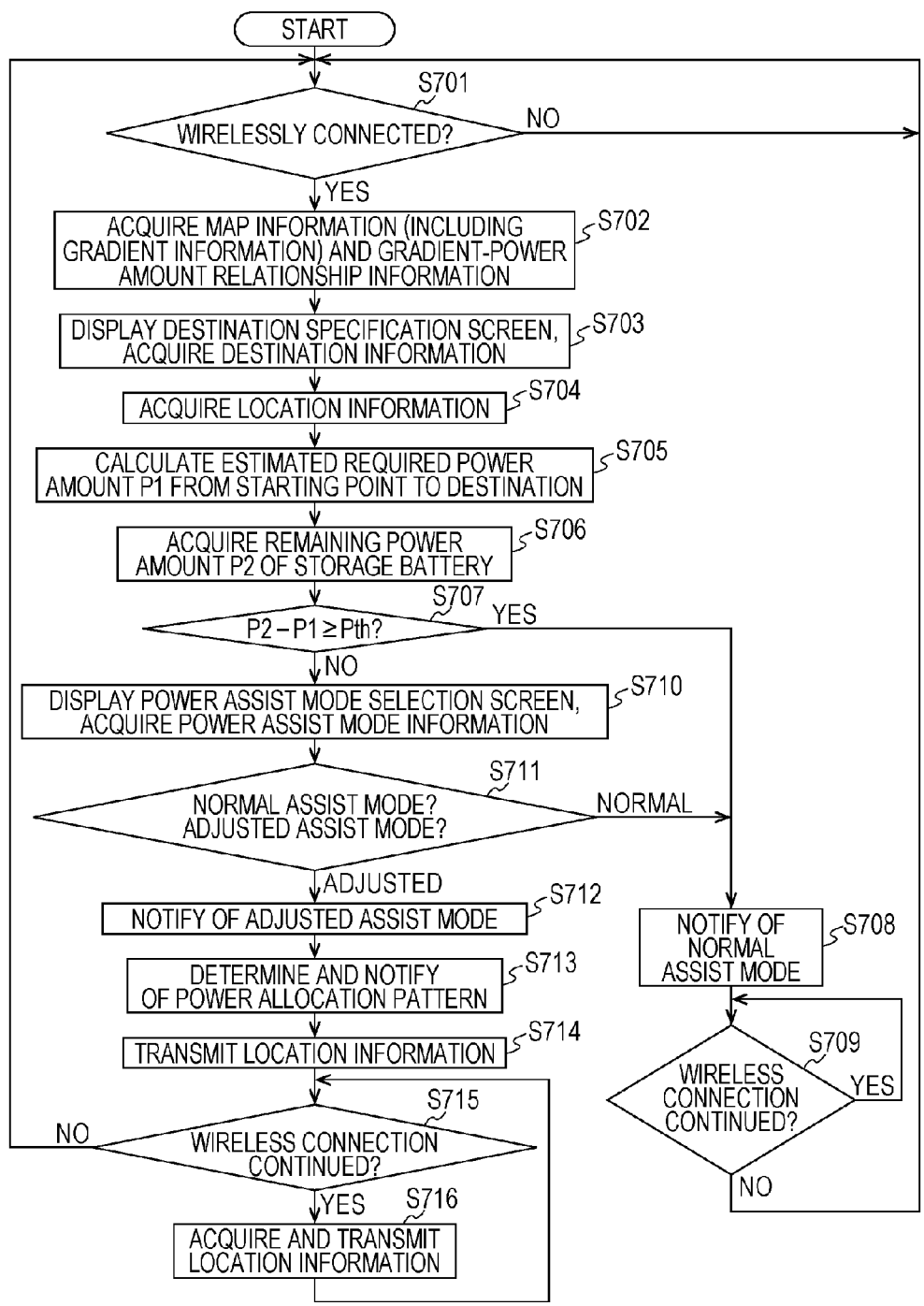
FIG. 16 is a flowchart showing a power allocation process performed by a mobile terminal according to the third embodiment.

If it does not determine that the remaining power amount P2 is larger than the estimated required power amount P1 by the threshold Pth or more (S707: NO), the controller 106 displays, on the display 110, the power assist mode selection screen whose example is shown in FIG. 16. The user operates the operation unit 111 to select the normal assist mode or adjusted assist mode, and the controller 106 receives power assist mode information indicating the power assist mode selected by the user from the operation unit 111 (step S710).

The controller 106 determines which of the normal assist mode and adjusted assist mode the user has selected, on the basis of the power assist mode information (step S711).

If the controller 106 determines that the user has selected the normal assist mode (S711: normal), step S708 is performed.

If it determines that the user has selected the adjusted assist mode (S711: adjusted), the controller 106 transmits power assist mode information indicating the adjusted assist mode to the power storage device 300 through the inter-device communication unit 108 and antenna 102 (step S712).

The controller 106 determines the allocated power amount of each two-point section of the course from the starting point to the destination as described above and transmits power allocation pattern information to the power storage device 300 through the inter-device communication unit 108 and antenna 102 on the basis of the determination (step S713).

The controller 106 then transmits the location information of the starting point acquired in step S704 to the power storage device 300 through the inter-device communication unit 108 and antenna 102 (step S714).

The controller 106 then determines whether the wireless connection between the mobile terminal 100 and power storage device 300 is continued (step S715). If the controller 106 determines that the wireless connection is continued (S715: YES), the GPS unit 109 acquires the location information of the mobile terminal 100 using GPS, and the controller 106 transmits this location information to the power storage device 300 through the inter-device communication unit 108 and antenna 102 (step S716). In contrast, if the controller 106 determines that the wireless connection is not continued (S715: NO), step S701 is performed.

FIG. 17 is a flowchart showing a power allocation determination process performed by the power storage device 300 according to the third embodiment.

An inter-device communication unit 307 searches for and authenticates the mobile terminal 100, which is paired with the power storage device 300, through the antenna 301 and attempts to wirelessly connect with the mobile terminal 100 (step S751). If the inter-device communication unit 307 has yet to wirelessly connect (S751: NO), step S751 is repeated.

If the inter-device communication unit 307 has wirelessly connected (S751: YES), the controller 306 receives an inquiry about the remaining power amount P2 of the storage battery 304 from the mobile terminal 100 through the antenna 301 and inter-device communication unit 307 and detects the remaining power amount P2 of the storage battery 304. Then, as a response to the inquiry, the controller 306 transmits remaining power amount information indicating the remaining power amount P2 of the storage battery 304 to the mobile terminal 100 through the inter-device communication unit 307 and antenna 301 (step S752).

The controller 306 then receives the power assist mode information from the mobile terminal 100 through the antenna 301 and inter-device communication unit 307 (step S753). The controller 306 then determines whether the power storage device 300 operates in the normal assist mode or adjusted assist mode, on the basis of the power assist mode information (step S754).

If it determines that the power storage device 300 operates in the normal assist mode (S754: normal), the power assist mode of the power storage device 300 becomes the normal assist mode, and the controller 306 causes the output controller 310 to output the driving power from the storage battery 304 to the motor 512 of the power-assisted bicycle 500 (step S755).

The controller 306 then determines whether the wireless connection between the power storage device 300 and mobile terminal 100 is continued (step S756). If the controller 306 determines that the wireless connection is continued (S756: YES), step S755 is performed. In contrast, if the controller 306 determines that the wireless connection is not continued (S756: YES), step S751 is performed.

If the controller 306 determines that the power storage device 300 operates in the adjusted assist mode (S754: adjusted), the power assist mode of the power storage device 300 becomes the adjusted assist mode (step S757).

The controller 306 then receives the power allocation pattern information from the mobile terminal 100 through the antenna 301 and inter-device communication unit 307 (step S758).

The controller 306 then acquires location information from the mobile terminal 100 through the antenna 301 and inter-device communication unit 307 (step S759).

The controller 306 then causes the output controller 310 to output the allocated power amount of driving power from the storage battery 304 to the motor 512 of the bicycle 500 on the basis of the power allocation pattern information and the location information as described above (step S760).

The controller 306 then determines whether the wireless connection between the power storage device 300 and mobile terminal 100 is continued (step S761). If it determines that the wireless connection is continued (S761: YES), the controller 306 receives location information from the mobile terminal 100 through the antenna 301 and inter-device communication unit 307 (step S762). In contrast, if the controller 306 determines that the wireless connection is not continued (S761: NO), step S751 is performed.

According to the third embodiment, it is possible to reduce situations in which the remaining power of the storage battery is lost before reaching the destination and thus the user cannot receive motor-driven assistance.

Modification

The present disclosure is not limited to the descriptions in the embodiments and can be implemented in any form for accomplishing the object of the present disclosure or objects or related to or associated with the present disclosure. For example, the present disclosure may be implemented in the following forms.

(1) In the above embodiments, when the power-assisted bicycle 500 is within a particular area, the output of the driving power from the storage battery 304 of the power storage device 300 to the motor 512 of the power-assisted bicycle 500 is controlled so that the power-assisted bicycle 500 operates discontinuously. However, this configuration need not be employed, and for example, the following configurations may be employed.

When the power-assisted bicycle 500 is within a particular area, the output of the driving power from the storage battery 304 of the power storage device 300 to the motor 512 of the power-assisted bicycle 500 may be controlled so that the speed of the power-assisted bicycle 500 is reduced compared to that when it is in an area which is not a particular area. If this description is applied to the first embodiment, an output power control command signal is a command to suppress the driving power outputted from the storage battery 304 to the motor 512. The suppression of the output of the driving power is one of examples in which when the motor-driven moving object of the present disclosure is within a particular area, the driving power is reduced compared to that when it is outside the particular area.

For example, power having a pulse waveform is used as the driving power outputted from the storage battery 304 to the motor 512, and the magnitude of the driving power outputted from the storage battery 304 to the motor 512 is controlled using the pulse width. For example, this can be done by reducing the pulse width so that the driving power outputted from the storage battery 304 to the motor 512 is reduced compared to the driving power requested on the basis of the pedaling force detected by the pedaling force detector 507. In other words, the duty ratio is reduced when the driving power is pulse-outputted from the storage battery 304 to the motor 512. The suppression of the output of the driving power described above is performed, for example, using a switching element that turns on or off the supply of the driving power from the power storage device to the motor-driven moving object, but other means may be used. Examples of such a switching element include an FET.

(2) The descriptions in the above embodiments can also be applied to a case in which the area in which output power control is performed is, for example, an area different from an area in which the user may collide with a moving object, such as an automobile or bicycle, or a pedestrian.

Figure 12:
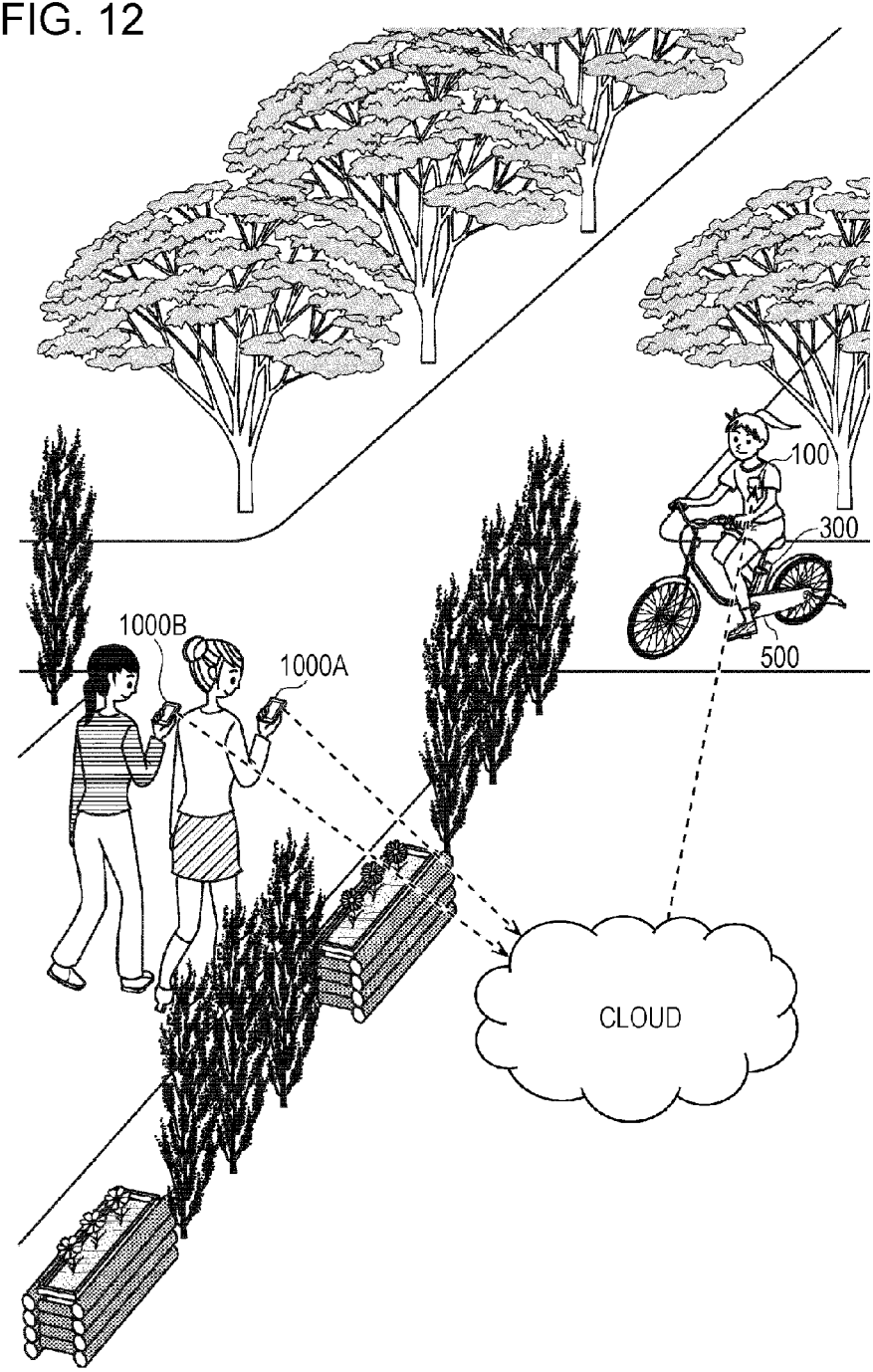
FIG. 12 is a diagram showing a modification of the first and second embodiments.

(3) In the above embodiments, when the user is driving the power-assisted bicycle 500 within a particular area described in particular area information included in map information, the output power of the storage battery 304 is controlled. However, other configurations may be employed. For example, as shown in FIG. 12, when persons carrying mobile terminals 1000A, 1000B, and the like are present close to the power-assisted bicycle 500, the output of the driving power from the storage battery 304 may be controlled. Such a case is also one of examples in which the driving power is controlled when the motor-driven moving object is within a particular area.

For example, if these descriptions are applied to the first embodiment, it is preferred to perform (3-A) described below; if these descriptions are applied to the second embodiment, it is preferred to perform (3-B) described below.

(3-A) The mobile terminals 100, 1000A, 1000B, and the like repeatedly acquire the location information of themselves, for example, using GPS and upload it to the server in the cloud.

The mobile terminal 100 carried by the user riding the power-assisted bicycle 500 (hereafter referred to as "the user mobile terminal") repeatedly acquires the location information of mobile terminals 1000A, 1000B, and the like other than the user mobile terminal 100 from the server in the cloud.

The user mobile terminal 100 then determines whether a predetermined number or more of other mobile terminals 1000A, 1000B, and the like are present within a predetermined distance from the user mobile terminal 100, on the basis of the location information of the user mobile terminal 100 and the location information of the other mobile terminals 1000A, 1000B, and the like. If it determines that the predetermined number or more of other mobile terminals are present within the predetermined distance, the user mobile terminal 100 wirelessly transmits an output power control command (intermittent driving power output command) signal to the power storage device 300. The presence of the predetermined number or more of other mobile terminals 1000A, 1000B, and the like within the predetermined distance from the user mobile terminal 100 is one of examples in which the motor-driven moving object is within a particular area.

The power storage device 300 receives the output power control command signal and intermittently outputs the driving power from the storage battery 304 to the motor 512 of the power-assisted bicycle 500 on the basis of the output power control command signal.

After transmitting the output power control command signal, the user mobile terminal 100 determines whether the predetermined number or more of other mobile terminals 1000A, 1000B, and the like are not present within the predetermined distance from the user mobile terminal 100, on the basis of the location information of the user mobile terminal 100 and the location information of the other mobile terminals 1000A, 1000B, and the like. If it determines that the predetermined number or more of other mobile terminals are not present within the predetermined distance, the user mobile terminal 100 wirelessly transmits an output power control stop command (intermittent driving power output stop command) signal to the power storage device 300.

The power storage device 300 receives the output power control stop command signal and stops intermittently outputting the driving power from the storage battery 304 to the motor 512 of the power-assisted bicycle 500 on the basis of the output power control stop command.

(3-B) The mobile terminals 100, 1000A, 1000B, and the like repeatedly acquire the location information of themselves, for example, using GPS and upload it to the server in the cloud. The mobile terminal (user mobile terminal) 100 carried by the user riding the power-assisted bicycle 500 wirelessly transmits the location information of itself acquired repeatedly to the power storage device 300.

The user mobile terminal 100 also repeatedly acquires the location information of mobile terminals 1000A, 1000 B, and the like other than the user mobile terminal 100 from the server in the cloud and wirelessly transmits it to the power storage device 300.

The power storage device 300 determines whether the predetermined number or more of other mobile terminals 1000A, 1000B, and the like are present within the predetermined distance from the user mobile terminal 100, on the basis of the location information of the user mobile terminal 100 and the location information of the other mobile terminals 1000A, 1,000 B, and the like. If it determines that the predetermined number or more of other mobile terminals are present within the predetermined distance, the power storage device 300 intermittently outputs the driving power from the storage battery 304 to the motor 512 of the power-assisted bicycle 500.

After starting intermittently outputting the driving power, the power storage device 300 determines whether the predetermined number or more of other mobile terminals 1000A, 1000B, and the like are not present within the predetermined distance from the user mobile terminal 100, on the basis of the location information of the user mobile terminal 100 and the location information of the other mobile terminals 1,000A, 1000B, and the like. If it determines that the predetermined number or more of other mobile terminals are not present within the predetermined distance, the power storage device 300 stops intermittently outputting the driving power from the storage battery 304 to the motor 512 of the power-assisted bicycle 500.

(4) While, in the description of the above embodiments, the condition for controlling the output of the driving power from the storage battery 304 to the motor 512 is the presence of the electric bicycle 500 within a particular area, the condition may be others.

For example, the output power control condition may be that the electric bicycle 500 is within a particular area and is traveling in a direction toward an intersection. The condition may also be that the electric bicycle 500 is within a particular area and is traveling a downhill. Whether the power-assisted bicycle 500 is traveling in a direction toward an intersection can be determined by using map information, as well as repeatedly acquired GPS-based location information. Whether the power-assisted bicycle 500 is traveling a downhill can be determined by adding the height information of each point to map information and using the height information of each location and repeatedly acquired GPS-based location information.

(5) While, in the description of the second embodiment, the mobile terminal 100 acquires location information using GPS and transmits it to the power storage device 300, other configurations may be employed. For example, the power storage device 300 may acquire location information using GPS.

(6) While, in the description of the first and second embodiments, the device to be controlled is the storage battery 304 or motor 512 and the control is the intermittent output of the driving power from the storage battery 304 to the motor 512 or the intermittent application of a load to the motor 512, other configurations may be employed. For example, the following configuration may be employed.

Figure 18:
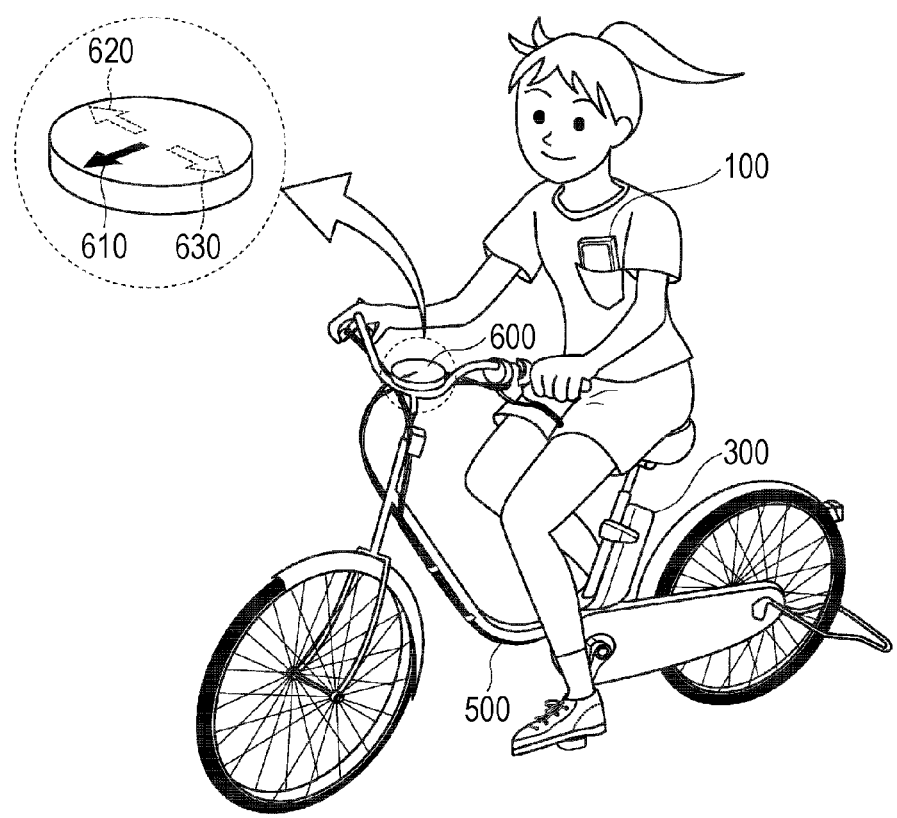
FIG. 18 is a diagram showing a modification of the first and second embodiments.

(6-A) The device to be controlled is a display unit 600 mounted adjacent to the handlebar of the power-assisted bicycle 500 whose example is shown in FIG. 18 and including a display device, and the control is to display directions 610, 620, and 630 to be traveled to reach the destination on the display of the display device. The display unit 600 has the function of wirelessly communicating with the mobile terminal 100. The direction shown by a black arrow is a direction to be traveled to reach the destination.

The mobile terminal 100 receives map information from the server in the cloud. The mobile terminal 100 then displays the destination specification screen on the display 110 and acquires destination information indicating the destination from the operation unit 111. The mobile terminal 100 also acquires the location information of the mobile terminal 100 (information indicating the starting point) using GPS. The mobile terminal 100 then determines the course from the starting point to the destination using these types of information.

The mobile terminal 100 then repeatedly acquires location information using GPS, identifies the direction to be traveled by the user using the location information and the determined course, and wirelessly transmits direction information indicating the direction to be traveled to the display unit 600.

The display unit 610 displays the direction to be traveled on the display on the basis of the direction information received from the mobile terminal 100.

The mobile terminal 100 may further acquire accident information or congestion information from the server in the cloud and may determine the course from the starting point to the destination using the map information as well as the accident information or congestion information.

The mobile terminal 100 may further acquire weather forecast information from the server in the cloud and may determine the course from the starting point to the destination also using the weather forecast information.

The mobile terminal 100 may further display a map on the display of the display unit so that the user is guided from the starting point to the destination.

(7) While, in the description of the third embodiment, a power allocation process is performed using the gradient information, gradient-power amount relationship information, and the like included in the map information acquired from the server in the cloud, other configurations may be employed. For example, the following configuration may be employed.

There may be employed a configuration in which the power storage device 300 acquires the use situation of the amount of power of the storage battery to be used until the user arrives at the destination after riding the power-assisted bicycle and leaving the starting point and then allocates the remaining amount of the power of the storage battery in accordance with the use situation of the power of the storage battery. Thus, power allocation suitable for the user can be performed.

An example of a method for acquiring the use situation of the amount of power of the storage battery is described below.

While the power-assisted bicycle 500 is traveling in the normal assist mode, the power storage device 300 repeatedly acquires location information from the mobile terminal 100 and repeatedly acquires the remaining power amount of the storage battery.

The power storage device 300 updates storage battery power use history information whose example is shown in FIG. 19 using two pieces of location information successively acquired from the mobile terminal 100 and the remaining power amounts of the storage battery corresponding to the two pieces of location information. Note that when the storage battery has no remaining power amount, power is not being supplied from the storage battery 304 to the motor 512 and therefore the power storage device 300 does not update the storage battery power use history information.

The storage battery power use history information is updated as follows.

If the storage battery power use history information does not contain the inter-point average power use amount of a first point described in the firstly acquired location information and a second point described in the secondly acquired location information, the following is performed.

The first-point location information and second-point location information are added to the storage battery power use history.

An inter-point average used power amount, which is a value (inter-point used power amount) obtained by subtracting the remaining power amount of the storage battery 304 at the second point from the remaining power amount of the storage battery 304 at the first point, an average traveling time, which is the time (traveling time) taken from the time point when the location information indicating the first point is received until the time point when the location information indicating the second point is received, and a value "1" representing a frequency are added to the storage battery power use history information so as to be associated with the first-point location information and second-point location information.

If the storage battery power use history information contains the inter-point average power use amount of the first point and the second point, the following is performed.

First, the inter-point average power use amount will be described.

By subtracting the remaining power amount of the storage battery 304 at the second point from the remaining power amount of the storage battery 304 at the first point, an inter-point used power amount (a) is obtained.

By multiplying the inter-point average used power amount (b) and a frequency (c) corresponding to the first point and second point in the storage battery power use history information, a value (b×c) is obtained.

By adding the multiplication result (b×c) to the inter-point used power amount (a), a value (a+(b×c)) is obtained; by adding a value "1" to the frequency (c), a value (c+1) is obtained; and by dividing the value (a+(b×c)) by the value (c+1), a value ((a+(b×c)/(c+1)) is obtained.

The inter-point average used power amount (b) corresponding to the first point and second point in the storage battery power use history information is replaced by the division result ((a+(b×c)/(c+1)).

Next, the average traveling time will be described.

The time (inter-point traveling time) taken (d) from the time point when the location information indicating the first point is received until the time point when the location information indicating the second point is received is obtained.

By multiplying the average traveling time (e) and the frequency (c) corresponding to the first point and second point in the storage battery power use history information, a value (e×c) is obtained.

By adding the multiplication result (e×c) to the inter-point traveling time (d), a value (d+(e×c)) is obtained; by adding a value "1" to the frequency (c), a value (c+1) is obtained; and by dividing the value (d+(e×c)) by the value (c+1), a value ((d+(e×c)/(c+1)) is obtained.

The average traveling time (e) corresponding to the first point and second point in the storage battery power use history information is replaced by the division result ((d+(e×c)/(c+1)).

Further, the frequency (c) corresponding to the first point and second point in the storage battery power use history information is replaced by (c+1).

In this way, the storage battery power use history information is updated.

What is described above is an example of a method for acquiring the use situation of the amount of power of the storage battery.

An example of power allocation using the use situation of the amount of power of the storage battery described above will be described below.

The mobile terminal 100 determines the course from the starting point to the destination on the basis of map information.

The mobile terminal 100 then acquires storage battery power use history information from the power storage device 300.

Then, referring to the storage battery power use history information, the mobile terminal 100 calculates the sum of the inter-point average used power amounts of the two-point sections of the course from the starting point to the destination. The sum is the estimated required power amount P1.

If the mobile terminal 100 determines that the remaining power amount P2 of the storage battery 304 is not larger than the estimated required power amount P1 by the threshold Pth or more and if the user selects the adjusted assist mode, the mobile terminal 100 performs the following. Referring to the storage battery power use history information, the mobile terminal 100 divides the inter-point average used power amount (E) of a two-point section by the estimated required power amount P1 and multiplies the remaining power amount P2 of the storage battery 304 by the division result (E/P1).

The multiplication result (P2×(E/P1)) is the allocated power amount of the two-point section. This calculation is performed with respect to the two-point sections of the course from the starting point to the destination.

The allocated power amount of each two-point section need not be determined as described above. For example, the allocated power amount of each two-point section may be determined by performing a weighting calculation as described in modification (1) of the third embodiment. For a two-point section having a steep uphill as described in modification (2), the inter-point average used power amount may be determined as the allocated power amount as it is.

As the value obtained by dividing the inter-point average used power amount (E) of a two-point section by the distance (B) of the two-point section is larger, the uphill can be deemed as steeper.

The mobile terminal 100 transmits, to the power storage device 300, power allocation pattern information including location information indicating a first point of each two-point section, location information indicating a second point thereof, information about the allocated power amount from the first point to the second point thereof, and information about the average traveling time from the first point to the second point thereof.

The power storage device 300 receives the power allocation pattern information from the mobile terminal 100. The power storage device 300 then repeatedly acquires the GPS-based location information of the mobile terminal 100 from the mobile terminal 1.

The mobile terminal 100 identifies the two-point section the user is traveling, of the two-point sections from the starting point to the destination on the basis of the first points and second points in the power allocation pattern information and the location information acquired from the mobile terminal 100. The mobile terminal 100 then identifies the allocated power amount of the identified two-point section on the basis of the power allocation pattern information.

The mobile terminal 100 then outputs the allocated power amount of driving power from the storage battery 304 from the motor 512 of the power-assisted bicycle 500 in the identified two-point section, which the user is traveling, over the average traveling time.

Note that each time the mobile terminal 100 acquires location information during traveling in the normal assist mode, it may acquire the remaining power amount of the storage battery 304 from the power storage device 300 and generate storage battery power use history information.

(8) While, in the description of the third embodiment, the specified section with respect to which the allocated power amount is determined is the section from the starting point to the destination specified by the user, configurations may be used. For example, the specified section with respect to which the allocated power amount is determined may be a two-point section specified by the user.

While, in the description of the third embodiment, the allocated power amount is determined once at the time of start, it may be determined in other manners. For example, in the middle of traveling from the starting point to the destination, the allocated power amount may be redetermined with respect to the section from the midway location to the destination. In this case, the specified section is the section from the midway location to the destination.

(9) If the mobile terminal 100 determines that the remaining power amount P2 of the storage battery 304 is not larger than the estimated required power amount P1 by the threshold Pth or more, for example, it may display a charge reminder message on the display 110 or may transmit an email destined for itself (mobile terminal 100).

(10) The power storage device 300 or 300A stores storage battery charge history information indicating the histories of the charge location and charge time zone in the memory 305.

Each time the storage battery 304 is charged, the power storage device 300 or 300A updates the storage battery charge history information stored in the memory 305. The power storage device 300 then transmits the updated storage battery charge history information to the mobile terminal 100, and the mobile terminal 100 receives the storage battery charge history information from the power storage device 300.

The mobile terminal 100 determines whether are a charge location and charge time zone, on the basis of the storage battery charge history information. If it determines that a the charge location and charge time zone, the mobile terminal 100 inquires of the power storage device 300 or 300A about the remaining power amount of the storage battery 304 and then acquires the remaining power amount from the power storage device 300 or 300A as a response to the inquiry.

If the remaining power amount is equal to or less than a predetermined amount, for example, the mobile terminal 100 may display a charge remainder message on the display 110 or may transmit an email destined for itself (mobile terminal 100).

(11) While, in the description of the third embodiment, the mobile terminal 100 acquires location information using GPS and transmits it to the power storage device 300, other configurations may be employed. For example, the power storage device 300 may acquire location information using GPS.

(12) The descriptions of the embodiments can be also applied to motor-driven moving objects other than power-assisted bicycles which are equipped with a power storage device and driven using a storage battery included in the power storage device as a power source, including electric scooters, electric wheelchairs, electric vehicles, hybrid electric vehicles, and fuel cell vehicles.

(13) While, in the embodiments and modifications, the mobile terminal 100 or power storage device 300 determines whether the motor-driven moving object is within a particular area, the server may make such a determination. In this case, the server acquires the location information of the mobile terminal 100 from the mobile terminal 100 and makes the determination. The server may transmit the determination to the mobile terminal 100 or may transmit, to the mobile terminal 100, a command about the output control of the driving power of the power storage device 300 based on the determination. The command transmitted to the mobile terminal 100 is transmitted to the power storage device 300.

When the server transmits the determination to the mobile terminal 100, the mobile terminal 100 may transmit the determination to the power storage device 300, and the power storage device 300 may control the output of the driving power of the power storage device 300 on the basis of the determination. Or, the mobile terminal 100 may transmit, to the power storage device 300, a command about the output control of the driving power of the power storage device 300 based on the transmitted determination.

(14) While, in the description of the embodiments, GPS is used to acquire location information, other means may be used as long as the means can acquire location information.

(15) In the embodiments, the external factor in which the motor-driven moving object equipped with the power storage device is not directly involved is a particular area. In the above (3-A) and (3-B), the external factor is the presence of other mobile terminals close to the user mobile terminal. However, the external factor is not limited thereto.

(16) In the embodiments, at least some components of the respective devices may be implemented as LSI (Large Scale integration), which is an integrated circuit. In this case, the components may be implemented as individual chips, or some or all thereof may be implemented as one chip. While the integrated circuit here is referred to as the LSI, it may be referred to as an IC (integrated circuit), system LSI, super LSI, or ultra LSI, depending on the degree of integration. The method for forming an integrated circuit is not limited to LSI and may be the use of a dedicated circuit or general-purpose processor. A field programmable gate array (FPGA) or a reconfigurable processor, which can reconfigure the connection or settings of circuit cells in LSI, may be used. If an integrated circuit technology which replaces LSI appears due to the progress of the semiconductor technology or due to a derived technology, the function blocks may be integrated using that technology, as a matter of course.

(17) At least part of the operation procedure of each device described in the embodiments or the like may be described as a program, and a central processing unit (CPU), for example, may read and execute the program stored in the memory. The program may be stored in recording media and distributed.

(18) The descriptions of the embodiments and modifications may be combined as appropriate.

Summary

The methods for controlling a power storage device and the like according to the embodiments and modifications and effects thereof are summarized below.

(A1) A method for controlling a power storage device of the present disclosure is a method for controlling a power storage device mounted on a motor-driven moving object. The method includes a step (a) of, when the motor-driven moving object is within a particular area, reducing the driving power supplied from the power storage device to the motor-driven moving object compared to the driving power when the motor-driven moving object is outside the particular area.

A power storage device of the present disclosure is a power storage device mounted on a motor-driven moving object. The power storage device includes a mounting unit configured to detachably mount the power storage device on a motor-driven moving object, an output controller configured to control output of driving power from the storage battery to the motor-driven moving object, and a controller configured to, when the motor-driven moving object is within a particular area, cause the output controller to reduce the driving power supplied from the power storage device to the motor-driven moving object compared to the driving power when the motor-driven moving object is outside the particular area. In the power storage device of the present disclosure, the output controller may output the driving power which is a direct current.

A program of the present disclosure is a program executed by a power storage device mounted on a motor-driven moving object. The program causes the power storage device to perform a process of, when the motor-driven moving object is within a particular area, reducing driving power supplied from the power storage device to the motor-driven moving object compared to the driving power when the motor-driven moving object is outside the particular area.

In this case, the drive power may be reduced in any manner. For example, the output of the driving power may be restricted so that the driving power is reduced compared to the driving power when the motor-driven moving object is outside the particular area. Or the driving power may be controlled so as to be intermittently reduced.

According to the method for controlling a power storage device, the power storage device, and the program described above, even if a motor-driven moving object is not previously provided with the function of controlling the driving power in an particular area, if a power storage device is caused to perform the control of the power storage device of the present disclosure, it is possible to reduce the driving power of the motor-driven moving object in a particular area.

(A2) According to the power storage device of the present disclosure, the power storage device of (A1) may further include a switching element configured to turn on or off supply of the driving power from the power storage device to the motor-driven moving object, and the controller may reduce the driving power using the switching element.

(A3) According to the power storage device of the present disclosure, in the power storage device of the above (A1) or (A2), the controller may cause the output controller to intermittently reduce the driving power supplied from the power storage device to the motor-driven moving object.

Thus, it is possible to cause the motor-driven moving object equipped with the power storage device to operate discontinuously. For example, by causing the motor-driven moving object equipped with the power storage device to operate discontinuously, it is possible to encourage the user to use caution in driving the motor-driven moving object.

(A4) According to the power storage device of the present disclosure, in any one of the power storage devices of the above (A1)-(A3), the controller may cause the output controller to reduce the driving power by supplying the driving power having a pulse waveform to the motor-driven moving object and reducing a pulse width of the driving power.

Thus, it is possible to control the operation of the motor-driven moving object equipped with the power storage device to reduce the speed of the motor-driven moving object.

(A5) According to the power storage device of the present disclosure, any one of the power storage devices of the above (A1)-(A4) may further include a communicator configured to communicate with the mobile terminal. When the motor-driven moving object is within a particular area, if the communicator receives a command to reduce the driving power from the mobile terminal, the controller may cause the output controller to reduce the driving power.

Thus, even when the power storage device cannot grasp the location of the motor-driven moving object, the mobile terminal can grasp the current location. Accordingly, if the power storage device can wirelessly communicate with the mobile terminal, it is possible to perform the method for controlling a power storage device of the present disclosure using the mobile terminal used by the user. That is, user convenience is increased.

(A6) According to the power storage device of the present disclosure, in the power storage device of the above (A5), the communicator may receive the command from the mobile terminal paired with the power storage device.

Thus, as long as a pairing setting is previously made, the user need not perform an operation for connecting the mobile terminal and power storage device each time he or she uses the motor-driven moving object equipped with the power storage device. That is, user convenience is increased.

(A7) In the power storage device of the present disclosure, any one of the power storage devices of the above (A1)-(A4) may include a communicator configured to communicate with a mobile terminal. When the communicator acquires information about a location of the motor-driven moving object from the mobile terminal, the controller may determine whether the motor-driven moving object is within a particular area, on the basis of the information about the location of the motor-driven moving object. If the controller determines that the motor-driven moving object is within a particular area, the controller may cause the output controller to reduce the driving power.

Thus, even when the power storage device cannot grasp the location of the motor-driven moving object, the mobile terminal can grasp the current location. Accordingly, if the power storage device can wirelessly communicate with the mobile terminal, it is possible to perform the method for controlling a power storage device of the present disclosure using the mobile terminal used by the user. That is, user convenience is increased.

(A8) According to the power storage device of the present disclosure, in the power storage device of the above (A7), the communicator may receive the information from the mobile terminal paired with the power storage device.

Thus, as long as a pairing setting is previously made, the user need not perform an operation for connecting the mobile terminal and power storage device each time he or she uses the motor-driven moving object equipped with the power storage device. That is, user convenience is increased.

(A9) According to the power storage device of the present disclosure, any one of the power storage devices of the above (A1)-(A4) may include a communicator configured to communicate with a mobile terminal. When the communicator receives, from the mobile terminal, information indicating that the motor-driven moving object is within a particular area, the controller may cause the output controller to reduce the driving power.

Thus, even when the power storage device cannot grasp the location of the motor-driven moving object, the mobile terminal can grasp the current location. Accordingly, if the power storage device can wirelessly communicate with the mobile terminal, it is possible to perform the method for controlling a power storage device of the present disclosure using the mobile terminal used by the user. That is, user convenience is increased.

(A10) According to the power storage device of the present disclosure, in the power storage device of the above (A9), the communicator may receive the information from the mobile terminal paired with the power storage device.

Thus, as long as a pairing setting is previously made, the user need not perform an operation for connecting the mobile terminal and power storage device each time he or she uses the motor-driven moving object equipped with the power storage device. That is, user convenience is increased.

(A11) A mobile terminal of the present disclosure includes a first communicator configured to communicate with a server, a second communicator configured to communicate with a power storage device mounted on a motor-driven moving object, and a controller configured to control operation of the power storage device through the second communicator on the basis of external information received from the server through the first communicator.

A method for controlling a mobile terminal of the present disclosure is a method for controlling a mobile terminal that communicates with a server. The method includes receiving external information from the server, generating control information for controlling operation of a power storage device, on the basis of the external information, and transmitting the control information to the device.

A program of the present disclosure is a program executed by a mobile terminal that communicates with a server. The program causes the mobile terminal to perform a process of receiving external information from a server and a process of generating control information for controlling operation of a power storage device, on the basis of the external information.

According to the mobile terminal, device control method, and device control program, it is possible to control the operation of the power storage device mounted on the motor-driven moving object on the basis of the external information.

(A12) According to the mobile terminal of the present disclosure, if the mobile terminal of the above (A11) determines that the motor-driven moving object is within a particular area, on the basis of the external information, the mobile terminal may cause, through the second communicator, the power storage device to reduce the driving power supplied from the power storage device to the motor-driven moving object compared to the driving power when the motor-driven moving object is outside the particular area.

Thus, it is possible to let the user know that the user is within the particular area.

(A13) According to the mobile terminal of the present disclosure, in the mobile terminal of the above (A12), the external information may be area information indicating a particular area in which the control is performed. The mobile terminal may further include a location information acquisition unit configured to acquire location information indicating a location of the mobile terminal, and it may be determined whether the motor-driven moving object is within the particular area, on the basis of the area information and the location information.

According to the mobile terminal of the present disclosure, in the mobile terminal of the above (A12), the external information may be location information indicating a location of another mobile terminal. The mobile terminal may further include a location information acquisition unit that acquires location information indicating a location of the mobile terminal. The controller may determine whether the motor-driven assistance is within the particular area, on the basis of the location information of the mobile terminal and the location information of the other mobile terminal. For example, if the controller determines that a predetermined number or more of other mobile terminals are present within a predetermined distance from the mobile terminal, the controller determines that the motor-driven moving object is within the particular area.

Thus, it is possible to let the user know that a person other than the user are present close to the user.

(A14) According to the mobile terminal of the present disclosure, in the mobile terminal of the above (A11), the controller calculates an estimated required power amount of power of a storage battery estimated to be used in a course of a specified section, acquires storage battery information about the storage battery through the second communicator, and when a remaining power amount of the storage battery is not larger than the estimated required power amount by a threshold or more on the basis of the estimated required power amount and the storage battery information about the storage battery, allocates the remaining power amount of the storage battery to the course of the specified section.

Thus, it is possible to prevent the remaining power amount of the storage battery from being lost before reaching the final point of the specified section. For example, if the specified section has a steep uphill near the final point, the user can receive motor-driven assistance even on the steep uphill near the final point.

(A15) According to the mobile terminal of the present disclosure, in the mobile terminal of the above (A14), when the remaining power amount of the storage battery is not larger than the estimated required power amount by the threshold or more, the controller places the power storage device in a mode in which power is supplied in accordance with the allocation.

(A16) According to the mobile terminal of the present disclosure, in the mobile terminal of the above (A14) or (A15), the controller calculates the estimated required power amount on the basis of storage battery use history information indicating the amount of power of the storage battery used in past traveling of the motor-driven moving object and allocates the remaining power amount of the storage battery on the basis of the storage battery use history information.

Thus, the user can receive motor-driven assistance based on the power allocation corresponding to the past traveling.

(A17) According to the mobile terminal of the present disclosure, in the mobile terminal of the above (A14) or (A15), the controller allocates the remaining power amount of the storage battery to the course of the specified section by dividing the course of the specified section into multiple two-point sections and determining the allocated power amount of each two-point section on the basis of a two-point section power amount determined on the basis of the gradient of the two-point section or a two-point section power amount determined on the basis of used power amount used in the past traveling of the motor-driven moving object.

(A18) According to the mobile terminal of the present disclosure, in the mobile terminal of the above (A17), the controller determines the allocated power amount of each of the two-point sections by dividing a two-point section power amount of the two-point section by the estimated required power amount and multiplying the remaining power amount of the storage battery by a division result.

(A19) According to the mobile terminal of the present disclosure, in the mobile terminal of the above (A17), the controller determines the allocated power amount of each of the two-point sections by performing a weighting calculation so that a two-point section having a steeper uphill is assigned a larger weight.

Thus, the user can efficiently receive motor-driven assistance on a steep hill.

(A20) According to the mobile terminal of the present disclosure, in the mobile terminal of the above (A17), the controller determines two-point section power amounts of the two-point sections as the allocated power amounts of the two-point sections in the descending order of two-point sections having a steeper uphill until a sum of the allocated power amounts determined with respect to the remaining power amount of the storage battery reaches a predetermined percentage.

Thus, the user can efficiently receive motor-driven assistance on a steep hill.

The present disclosure can be used in power storage devices that supply power to a motor-driven moving object.

What is claimed is:

1. A power storage device comprising:
a storage battery;
a mount that detachably mounts the power storage device on a motor-driven moving object having a motor;
an output controller that controls output of driving power from the storage battery to the motor; and
a controller programmed to, when the motor-driven moving object is within a particular area, cause the output controller to reduce the driving power supplied from the power storage device to the motor, compared to the driving power when the motor-driven moving object is outside the particular area,
wherein the output controller and the controller are provided in the power storage device.

2. The power storage device according to claim 1, wherein the driving power is a direct current.

3. The power storage device according to claim 1, wherein the output controller comprises a switch that turns on or off the supply of the driving power from the power storage device to the motor, and
the controller is programmed to cause the output controller to reduce the driving power using the switch.

4. The power storage device according to claim 1, wherein the controller is programmed to cause the output controller to intermittently reduce the driving power supplied from the power storage device to the motor.

5. The power storage device according to claim 1, wherein the controller is programmed to cause the output controller to reduce the driving power by supplying the driving power having a pulse waveform to the motor and reducing a pulse width of the pulse waveform of the driving power.

6. The power storage device according to claim 1, further comprising a receiver that communicates with a mobile terminal, wherein when the motor-driven moving object is within the particular area, if the receiver receives a command to reduce the driving power from the mobile terminal, the controller has been programmed to cause the output controller to reduce the driving power.

7. The power storage device according to claim 6, wherein the mobile terminal is pairable with the power storage device, and wherein the receiver receives the command from the mobile terminal when the mobile terminal is paired with the power storage device.

8. The power storage device according to claim 1, further comprising a receiver that communicates with a mobile terminal, wherein
when the receiver receives information about a location of the motor-driven moving object from the mobile terminal, the controller has been programmed to determine whether the motor-driven moving object is within the particular area, on the basis of the received information about the location of the motor-driven moving object, and if the controller determines that the motor-driven moving object is within the particular area, the controller has been programmed to cause the output controller to reduce the driving power supplied from the power storage device.

9. The power storage device according to claim 8, wherein the mobile terminal is pairable with the power storage device, and wherein the receiver receives the information from the mobile terminal when the mobile terminal is paired with the power storage device.

10. The power storage device according to claim 1, further comprising a receiver that communicates with a mobile terminal, wherein when the receiver receives, from the mobile terminal, information indicating that the motor-driven moving object is within the particular area, the controller has been programmed to cause the output controller to reduce the driving power.

11. The power storage device according to claim 10, wherein the receiver receives the information from the mobile terminal when paired with the power storage device.

12. The power storage device according to claim 1, further comprising:
positive and negative terminals connectable to the motor-driven moving object; and
an enclosure housing:
the storage battery;
a display;
the controller; and
the output controller,
the output controller being connected to the storage battery and to the positive and negative terminals and programmed to control the output of driving power from the storage battery to the motor; and
wherein the controller is connected to the output controller and the display.

13. The power storage device according to claim 1,
wherein the controller is programmed to identify an area as the particular area when the controller determines that the motor-driven moving object is at increased risk of a collision in the area,
wherein the controller is programmed to, when the motor-driven moving object is within the particular area, cause the output controller to start an intermittent driving-power output from the power storage device to the motor, causing an operator-perceptible intermittent operation of the motor, and
wherein the operator-perceptible intermittent operation of the motor indicates that the controller has determined entry of the motor-driven moving object into the particular area in which the motor-driven moving object is at the increased risk of the collision.

14. The power storage device according to claim 1,
wherein the controller is programmed to identify an area as the particular area when the controller determines that the motor-driven moving object is at increased risk of a collision in the area,
wherein the controller is programmed to, when the motor-driven moving object is within the particular area, cause the output controller to start an intermittent driving-power output from the power storage device to the motor, causing an operator-perceptible intermittent operation of the motor, and
wherein the controller is programmed to control the output controller to stop the operator-perceptible intermittent operation of the motor in response to a determination that the motor-driven moving object has exited the particular area, thereby stopping the operator-perceptible intermittent operation of the motor-driven moving object, indicating exiting of the motor-driven moving object from the particular area in which the motor-driven moving object is at the increased risk of the collision.

15. The power storage device according to claim 1, wherein the controller is programmed to identify an area with a blind spot, an intersection, a hill, or traffic congestion as the particular area with an increased risk of collision.

16. The power storage device according to claim 1, further comprising:
a receiver communicating with a mobile terminal, and
a memory receiving a geographic map from the mobile terminal via the receiver,
wherein the controller is programmed to
identify an area as the particular area when the controller determines that the motor-driven moving object is at increased risk of a collision in the area, and
determine whether the motor-driven moving object is inside the particular area using the stored geographic map.

17. A method comprising:
providing an output controller, a controller, and a storage battery in a power storage device detachably mounted on a motor-driven moving object having a motor;
controlling, with the output controller, output of driving power from the storage battery to the motor; and
causing the output controller, with the controller, when the motor-driven moving object is within a particular area, to reduce the driving power supplied from the power storage device to the motor compared to the driving power when the motor-driven moving object is outside the particular area.

18. A power storage device comprising:
a storage battery;
a mount that detachably mounts the power storage device on a motor-driven moving object having a motor;
an output controller that controls output of driving power from the storage battery to the motor;
a receiver communicating with a mobile terminal, and
a controller programmed to, when the motor-driven moving object is within a particular area, cause the output controller to reduce the driving power supplied from the power storage device to the motor compared to the driving power when the motor-driven moving object is outside the particular area,
wherein the controller is further programmed to, once the output controller starts reducing the driving power supplied from the power storage device, stop the output controller from reducing the driving power supplied from the power storage device if the receiver has not received an output power control stop command signal for a predetermined period.

* * * * *